United States Patent
Hirao et al.

(10) Patent No.: US 8,322,728 B2
(45) Date of Patent: Dec. 4, 2012

(54) SUSPENSION CONTROL APPARATUS

(75) Inventors: Ryusuke Hirao, Matsudo (JP);
Takahide Kobayashi, Kawaguchi (JP);
Nobushige Wakamatsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 784 days.

(21) Appl. No.: 12/232,803

(22) Filed: Sep. 24, 2008

(65) Prior Publication Data
US 2009/0085309 A1    Apr. 2, 2009

(30) Foreign Application Priority Data

Sep. 28, 2007 (JP) ................................ 2007-254575
Sep. 28, 2007 (JP) ................................ 2007-255453

(51) Int. Cl.
*B60G 21/045* (2006.01)
(52) U.S. Cl. .............. 280/5.506; 280/5.512; 280/5.513; 280/5.515; 701/38
(58) Field of Classification Search .................. 701/37, 701/38; 280/5.5, 5.503, 5.506, 5.507, 5.512, 280/5.513, 5.515
See application file for complete search history.

(56) References Cited

U.S. PATENT DOCUMENTS

| | | | | |
|---|---|---|---|---|
| 4,989,148 A * | 1/1991 | Gurke et al. | | 701/37 |
| 5,142,476 A * | 8/1992 | Shibata et al. | | 701/38 |
| 5,444,621 A | 8/1995 | Matsunaga et al. | | |
| 5,563,789 A * | 10/1996 | Otterbein et al. | | 701/38 |
| 5,570,289 A * | 10/1996 | Stacey et al. | | 701/37 |
| 5,692,587 A * | 12/1997 | Fratini, Jr. | | 188/266.2 |
| 5,839,082 A * | 11/1998 | Iwasaki | | 701/38 |
| 5,864,768 A * | 1/1999 | Bieber et al. | | 701/38 |
| 5,897,130 A * | 4/1999 | Majeed et al. | | 280/5.507 |
| 6,000,702 A * | 12/1999 | Streiter | | 280/5.507 |
| 6,202,011 B1 | 3/2001 | Jeon | | |
| 6,285,935 B1 * | 9/2001 | Murata | | 701/37 |
| 6,684,140 B2 * | 1/2004 | Lu | | 701/37 |
| 6,873,890 B2 * | 3/2005 | Song | | 701/37 |
| 7,113,863 B2 * | 9/2006 | Sawada et al. | | 701/111 |
| 7,222,007 B2 * | 5/2007 | Xu et al. | | 701/38 |
| 7,286,919 B2 * | 10/2007 | Nordgren et al. | | 701/37 |
| 7,406,372 B2 * | 7/2008 | Kim et al. | | 701/38 |
| 7,548,806 B2 * | 6/2009 | Yasutake et al. | | 701/72 |
| 7,747,368 B2 * | 6/2010 | Tomida et al. | | 701/38 |
| 2003/0014167 A1 * | 1/2003 | Pedersen et al. | | 701/37 |

(Continued)

FOREIGN PATENT DOCUMENTS

JP        4-42406        4/1992

(Continued)

OTHER PUBLICATIONS

Hado et al., Damping Force Controller for Suspension, Sep. 10, 1996, JPO, JP 08-230433 A, English Abstract.*
Hado et al., Damping Force Controller for Suspension, Sep. 10, 1996, JPO, JP 08-230433 A, Machine Translation of Description.*

(Continued)

*Primary Examiner* — Paul N Dickson
*Assistant Examiner* — James English
(74) *Attorney, Agent, or Firm* — Wenderoth, Lind & Ponack, L.L.P.

(57) ABSTRACT

The present invention provides a suspension control apparatus requiring a reduced number of sensors. A pitch rate estimating unit 21 calculates a pitch rate used for creating a control instruction value, with use of a wheel-speed time-rate-of change obtained based on wheel speeds $vc_{FL}$ and $vc_{FR}$ detected by wheel speed sensors 7FL and 7FR, and an estimated forward/backward acceleration $a_{es}$ calculated by a forward/backward acceleration estimating unit 20.

18 Claims, 22 Drawing Sheets

U.S. PATENT DOCUMENTS

| | | | | |
|---|---|---|---|---|
| 2004/0153226 A1* | 8/2004 | Song | | 701/37 |
| 2005/0149240 A1* | 7/2005 | Tseng et al. | | 701/38 |
| 2006/0041353 A1* | 2/2006 | Sawada et al. | | 701/37 |
| 2006/0085112 A1* | 4/2006 | Lu et al. | | 701/38 |
| 2006/0224287 A1* | 10/2006 | Izawa et al. | | 701/37 |
| 2007/0260372 A1* | 11/2007 | Langer | | 701/29 |
| 2008/0183353 A1* | 7/2008 | Post et al. | | 701/42 |

FOREIGN PATENT DOCUMENTS

| | | |
|---|---|---|
| JP | 8-230433 | 9/1996 |
| JP | 09-226336 | 9/1997 |
| JP | 10-100633 | 4/1998 |
| JP | 11-198624 | 7/1999 |
| JP | 2000-283758 | 10/2000 |
| JP | 2006-082751 | 3/2006 |
| WO | WO 2006126342 A1 * | 11/2006 |

OTHER PUBLICATIONS

Takahashi, Device for Detecting Attitude of Vehicle, Oct. 13, 2000, JPO, JP 2000-283758 A, English Abstract.*

Takahashi, Device for Detecting Attitude of Vehicle, Oct. 13, 2000, JPO, JP 2000-283758 A, Machine Translation of Description.*

Satoru Takahashi, Device for Detecting Attitude of Vehicle, Oct. 13, 2000, JPO, JP 2000-283758 A, Derwent Abstract.*

Partial European Search Report (in English language) issued Jan. 20, 2009 in European Patent Application No. 08165232.3.

Japanese Office Action (together with partial English translation) mailed Nov. 16, 2011 in related Japanese Patent Application No. 2007-254575.

Japanese Office Action issued Jul. 4, 2012 in corresponding Japanese Application No. 2007-254575, with partial English translation.

* cited by examiner

SUSPENSION CONTROL APPARATUS

BACKGROUND OF THE INVENTION

(1) Field of the Invention

The present invention relates to a suspension control apparatus for use in a vehicle.

(2) Description of Related Art

Performing an oscillation control of a vehicle body requires a lot of information, such as an up/down motion and a position (for example, pitch and roll) of the vehicle body, and up/down relative speeds between wheels and the vehicle body. If sensors dedicated for the respective data are mounted on the vehicle, the cost of the sensors is increased. Therefore, it is preferable to reduce the number of sensors as many as possible.

To reduce the number of sensors, for example, a value (such as an angular speed of a wheel) detected by a sensor mounted for another purpose than the oscillation control is utilized to calculate or estimate another value (for example, a relative speed between the wheel and the vehicle body) that can be used for the oscillation control. By this arrangement, a total of sensors on the whole vehicle can be reduced. Such a suspension control apparatus is disclosed in, for example, Japanese Patent Application Public Disclosure Hei 8-230433.

Although cutting down of the number of sensors is realized by the suspension control apparatus disclosed in Japanese Patent Application Public Disclosure Hei 8-230433, needs for reducing the number of sensors still continue to exist.

BRIEF SUMMARY OF THE INVENTION

The present invention has been contrived in consideration of the above-mentioned circumstance, and an object thereof is to provide a suspension control apparatus with a reduced number of sensors.

One aspect of the present invention is a suspension control apparatus comprising a damping force adjustable shock absorber interposed between a vehicle body and a wheel, of which a damping characteristic is changed by an instruction from an outside, and a control apparatus operable to control the damping characteristic of the shock absorber. The control apparatus comprises a first up/down motion calculating unit operable to calculate an up/down motion of a first point set to any position of the vehicle body, a roll motion estimating unit operable to estimate a roll motion of the vehicle body, a pitch motion estimating unit operable to estimate a pitch motion of the vehicle body, a various portions up/down motion calculating unit operable to calculate up/down motions of various portions of the vehicle body based on the up/down motion, the roll motion and the pitch motion, and a controller operable to calculate an instruction according to the up/down motions of the various portions and output the instruction to the damping force adjustable shock absorber. The pitch motion estimating unit comprises a wheel rotation calculating unit operable to calculate a rotation of the wheel, a forward/backward motion calculating unit operable to calculate a forward/backward motion of the vehicle body, and a subtracting unit operable to calculate a pitch rate based on a difference between the wheel rotation and the forward/backward motion.

According to the present invention, it is possible to provide a suspension control apparatus with a reduced number of sensors.

DETAILED DESCRIPTION OF THE INVENTION

Figure 1:
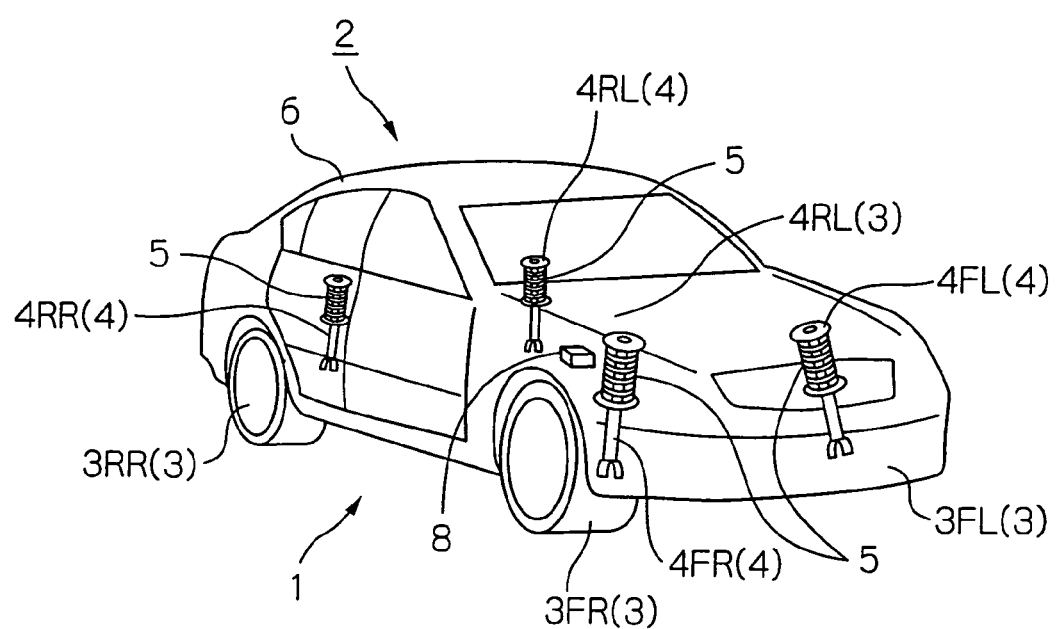
FIG. 1 is a perspective view schematically illustrating a layout of components of a vehicle provided with a suspension control apparatus of a first second embodiment of the present invention.

Hereinafter embodiments of the present invention will be described.

First Embodiment

A suspension control apparatus of a first embodiment comprises a damping force adjustable shock absorber interposed between a vehicle body and a vehicle wheel, and a control apparatus. Damping characteristics of the shock absorber are changed according to an instruction from an outside. The control apparatus is operable to control the damping characteristics of the shock absorber. The control apparatus comprises a first up/down motion calculating unit operable to calculate an up/down motion of a first point set to any position in the vehicle body, a roll motion estimating unit operable to estimate a roll motion of the vehicle body, a pitch motion estimating unit operable to estimate a pitch motion of the vehicle body, a various portions up/down motion calculating unit operable to calculate up/down motions of various portions of the vehicle body from the up/down motion, the roll motion and the pitch motion, and a controller operable to calculate an instruction according to the up/down motions of the various portions and send the instruction to the damping force adjustable shock absorber. The pitch motion estimating unit comprises a wheel rotation calculating unit operable to calculate a rotation of the wheel, a forward/backward motion calculating unit operable to calculate a forward and backward movement of the vehicle body, and a subtracting unit operable to calculate a pitch rate from a difference between the wheel rotation and the forward and backward movement.

In this description, the phrase "up/down motion" is used to denote a physical quantity of an up/down motion, and includes an up/down displacement. The phrase "roll motion" is used to denote a physical quantity of a roll motion and includes a roll angular speed (roll rate). The phrase "pitch motion" is used to denote a physical quantity of a pitch motion, and includes a pitch angle acceleration. The phrase "wheel rotation" is used to denote a physical quantity of a wheel rotational motion, and includes an angular speed, a wheel speed (product of an angular speed and an effective radius of a wheel), and an angular acceleration. The phrase "wheel rotation calculating unit" is used to denote a mechanism which calculates a wheel rotation, and includes a wheel speed sensor and an angular sensor. The phrase "forward/backward motion of a vehicle body" is used to denote a physical quantity of a forward/backward motion of a vehicle, and includes a vehicle body speed and a vehicle body acceleration. The phrase "forward/backward motion calculating unit" is used to denote a mechanism which calculates a forward/backward motion of a vehicle body, and includes a speed sensor and an acceleration sensor.

The suspension control apparatus in the present embodiment may comprise a dimension converting unit operable to, when a dimension of a wheel rotation and a dimension of a forward/backward motion are different, convert the dimensions so that they become the same. Estimation accuracy can be improved by performing this dimension converting process before a difference between the wheel rotation and the forward/backward motion is calculated. The dimension converting unit may be embodied by, for example, a differentiator or an integrator. The phrase "dimension" is used to denote any physical quantity expressed as a product of time (T), length (L) and mass (M). For example, an acceleration can be expressed as "$L*M^{-2}$".

The suspension control apparatus of the present embodiment may comprise a converting unit operable to multiply at least one of wheel rotation, vehicle body motion, and difference between them by a predetermined coefficient. For example, when a pitch rate is calculated from a difference between a wheel speed and a vehicle body speed, the difference is not a value of the pitch rate itself but a value proportional to the pitch rate. Therefore, it becomes easy to perform the subsequent calculation by converting the difference into a pitch rate by multiplying the difference by a predetermined coefficient.

Further, in the suspension control apparatus of the present embodiment, if a vehicle has a pair of wheels on the left and right sides of the vehicle body, an average value of wheel rotations of the pair of wheels may be used as the wheel rotation. Estimation accuracy of a pitch motion (for example, pitch rate) can become higher than a wheel rotation of only one of the right and left wheels is used.

Further, in the suspension control apparatus of the present embodiment, if a vehicle has a pair of wheels on the left and right sides of the vehicle body, calculation of a pitch motion may not be performed when the wheel rotations of the pair of wheels are in opposite phases. When the wheel rotations of the pair of wheels are in opposite phases, it is considered that the vehicle is running on a rough road. Therefore, estimation accuracy of a pitch motion may be deteriorated in this case. By this arrangement, performing estimation with low accuracy can be avoided.

Further, in the suspension control apparatus of the first embodiment, if a vehicle has a driving wheel to which a driving force is applied, and a driven wheel to which a driving force is not applied, a wheel rotation may be determined from a rotation of the driven wheel. Since wheel speed of the driven wheel is not easily changed by the driving force, estimation accuracy of a pitch motion can become higher than the wheel rotation is determined from a rotation of the driving wheel.

In the suspension control apparatus of the present embodiment, a forward/backward motion may be calculated from an output of a forward/backward acceleration sensor. Since a forward/backward motion is calculated from a forward/backward acceleration that is directly detected, estimation accuracy can be improved. Cost can be reduced if the forward/backward acceleration sensor is also used for another application such as a slip control In the suspension control apparatus of the present embodiment, if the vehicle includes a motor torque detecting unit operable to detect a torque of a motor, a forward/backward motion may be calculated from an output of the motor torque detecting unit. The phrase "motor" is used to denote any driving source of a vehicle such as a commonly-used gasoline engine, a diesel engine or an electric motor.

If a transmission (for example, MT, AT or CVT) is interposed between the motor and the wheel, a forward/backward motion may be calculated from a product of an output of the motor torque detecting unit and a total speed reduction ratio from the motor to the wheel.

If the vehicle includes a torque converter, a forward/backward motion may be determined by multiplication by a coefficient according to lockup and slide of the torque converter. By this arrangement, it is possible to improve estimation accuracy of a pitch motion.

A forward/backward motion may be determined with an external force (for example, air resistance) applying to the vehicle body taken into consideration.

In the suspension apparatus of the present embodiment, if the vehicle includes a braking mechanism, a forward/backward motion may be determined based on a braking force generated by the braking mechanism.

If the braking mechanism is a hydraulic disk brake, a forward/backward motion may be determined based on a hydraulic pressure of the hydraulic disk brake.

An upper limit value may be set for calculating a forward/backward motion. This is because estimation of an acceleration generated by a hydraulic pressure is larger than an actual acceleration, when wheel lock occurs by braking. Therefore, it is preferable to determine the upper limit value based on an acceleration when wheel lock occurs by braking.

If the braking mechanism is a regenerative brake, a forward/backward motion may be determined based on an electric power generated by the regenerative brake during braking.

In the suspension control apparatus of the present embodiment, a forward/backward motion may be determined based on positional information of the vehicle from a GPS. For example, a vehicle speed can be determined from a travel distance during a predetermined time period.

In the suspension control apparatus of the present embodiment, the control apparatus may comprise an integrator. The up/down motion calculating unit may be operable to calculate an up/down acceleration of a point in the vehicle body. The roll motion estimating unit may be operable to estimate a roll acceleration of the vehicle body. The pitch motion estimating unit may be operable to estimate a pitch acceleration of the vehicle body. The various portions up/down motion calculating unit may be operable to calculate up/down accelerations of various portions in the vehicle body based on the up/down acceleration, the roll acceleration and the pitch acceleration. The integrator may be operable to integrate up/down accelerations of the various portions to calculate up/down speeds of the various portions. The controller may be operable to calculate an instruction according to the up/down speeds of the various portions and transmit the instruction to the damping force adjustable shock absorber. By this arrangement, for example, estimation accuracy can become higher than the up/down speeds of the various portions of the vehicle body is calculated from the up/down speed, if the up/down acceleration sensor is used as an up/down motion calculating unit. This is because it is possible to prevent error made by using a differentiator, since it is possible to use an output of the up/down acceleration sensor as it is, without requiring processing the output with the differentiator Further, a second point may be set to a position away from the first position in a warp direction different from a pitch direction of the vehicle body, and the suspension control apparatus of the present embodiment may comprise a second up/down motion calculating unit operable to calculate an up/down motion of the second point. The suspension control apparatus may further comprise a warp motion calculating unit operable to calculate a warp motion based on up/down motions of the first and second points. In the roll motion estimating unit, a roll motion of the vehicle body may be estimated based on a difference between the warp motion and the pitch motion. By this arrangement, for example, it becomes possible to utilize an output from a vehicle height sensor mounted adjacent a rear wheel to estimate an axis of head light illumination, whereby the required number of sensors mounted on the vehicle can be reduced.

Similarly, a second point may be set to a position away from the first position in a warp direction different from a roll direction of the vehicle body, and the suspension control apparatus of the present embodiment may comprise a second up/down motion calculating unit operable to calculate an up/down motion of the second point. The suspension control apparatus may further comprise a warp motion calculating unit operable to calculate a warp motion based on the up/down motions of the first and second points. In the pitch motion estimating unit, a pitch motion of the vehicle body may be estimated based on a difference between the warp motion and the roll motion. By this arrangement, for example, it becomes possible to utilize an output from the vehicle height sensor mounted adjacent a rear wheel to estimate an axis of head light illumination, whereby the required number of sensors mounted on the vehicle can be reduced.

Second Embodiment

More specifically, a suspension control apparatus of a second embodiment of the present invention will be described with reference to FIGS. 1 to 6.

Figure 2:
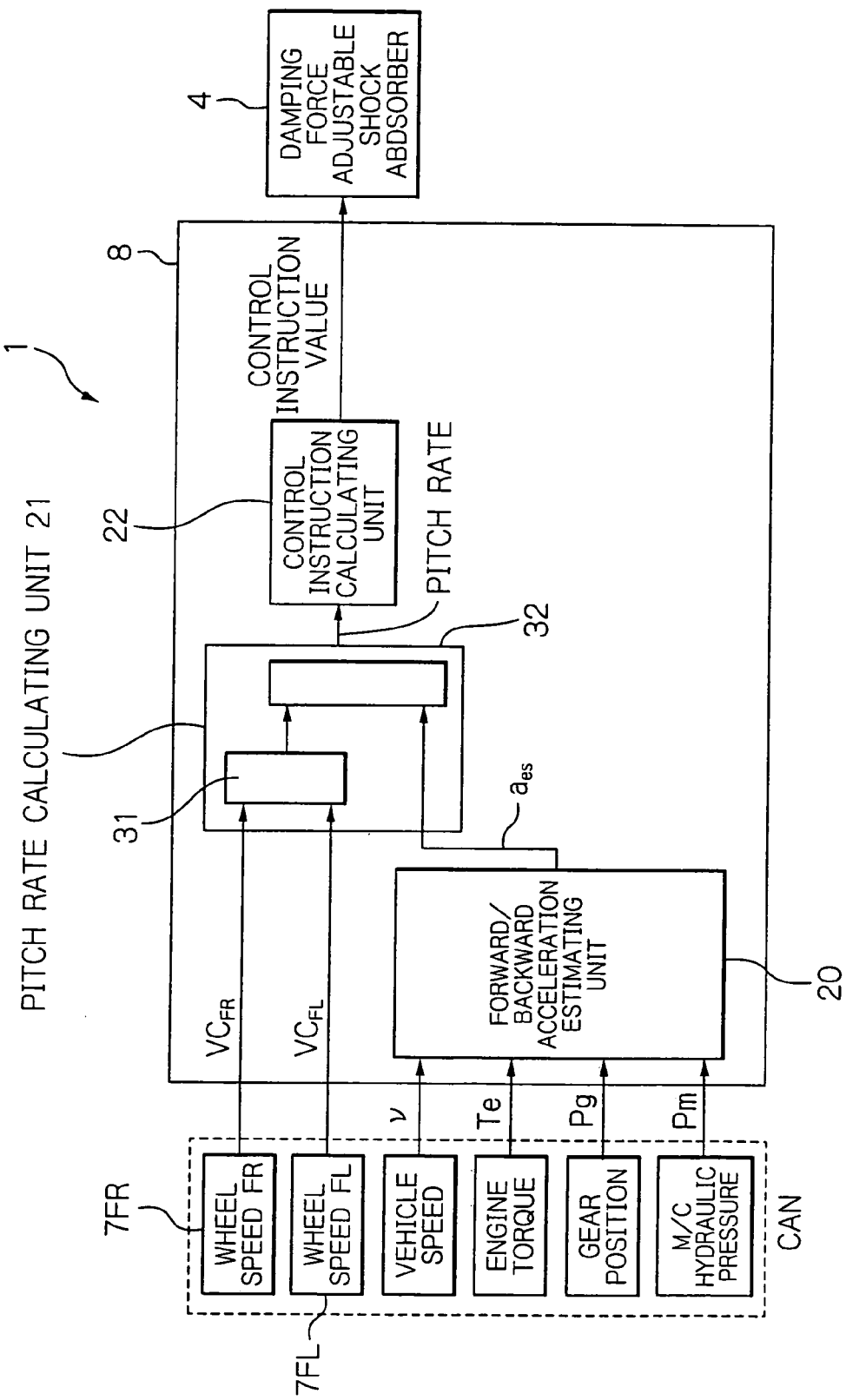
FIG. 2 is a block diagram illustrating a control function of a control apparatus in the vehicle shown in FIG. 1.
Figure 3:
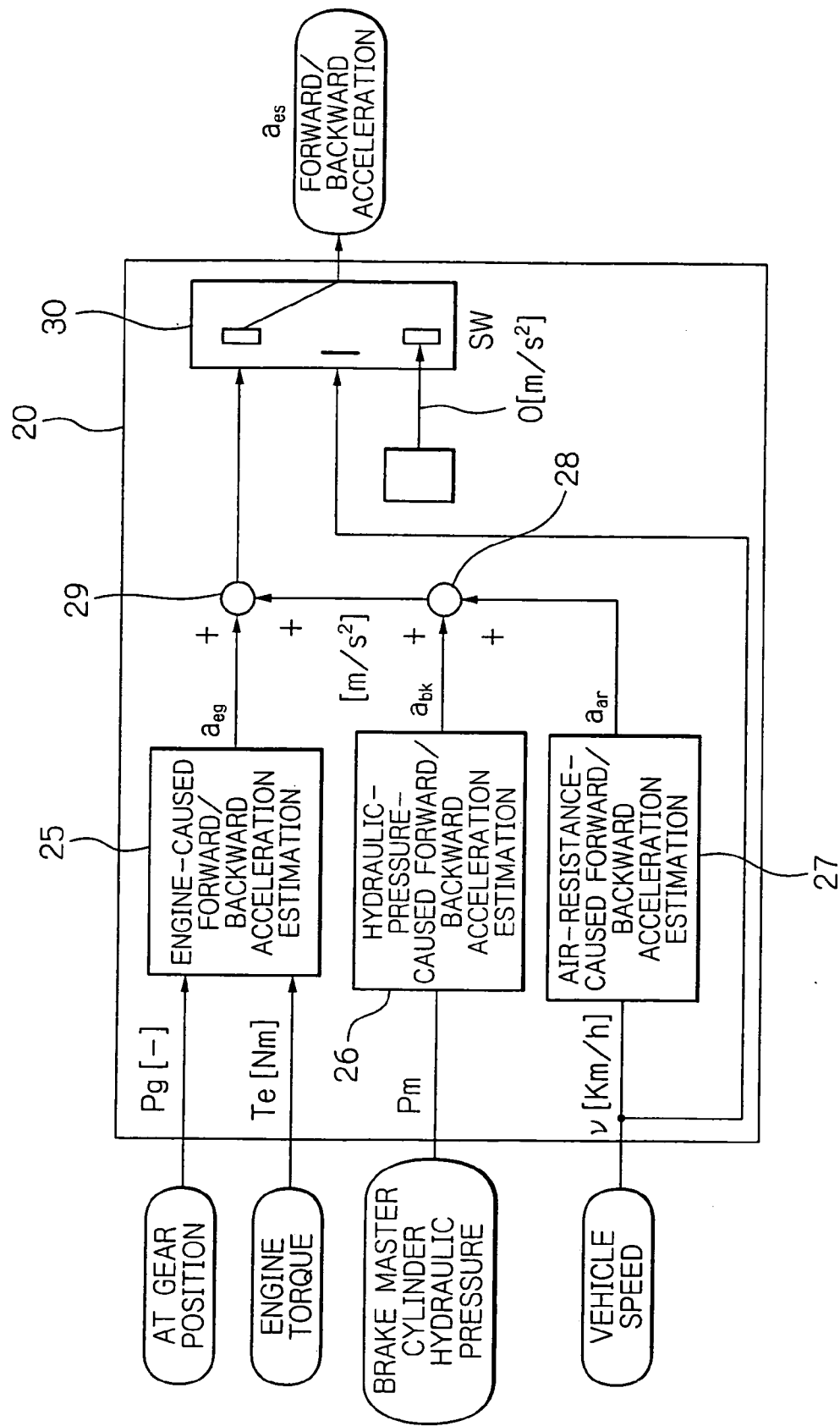
FIG. 3 is a block diagram illustrating a forward/backward acceleration estimating unit shown in FIG. 2.
Figure 4:
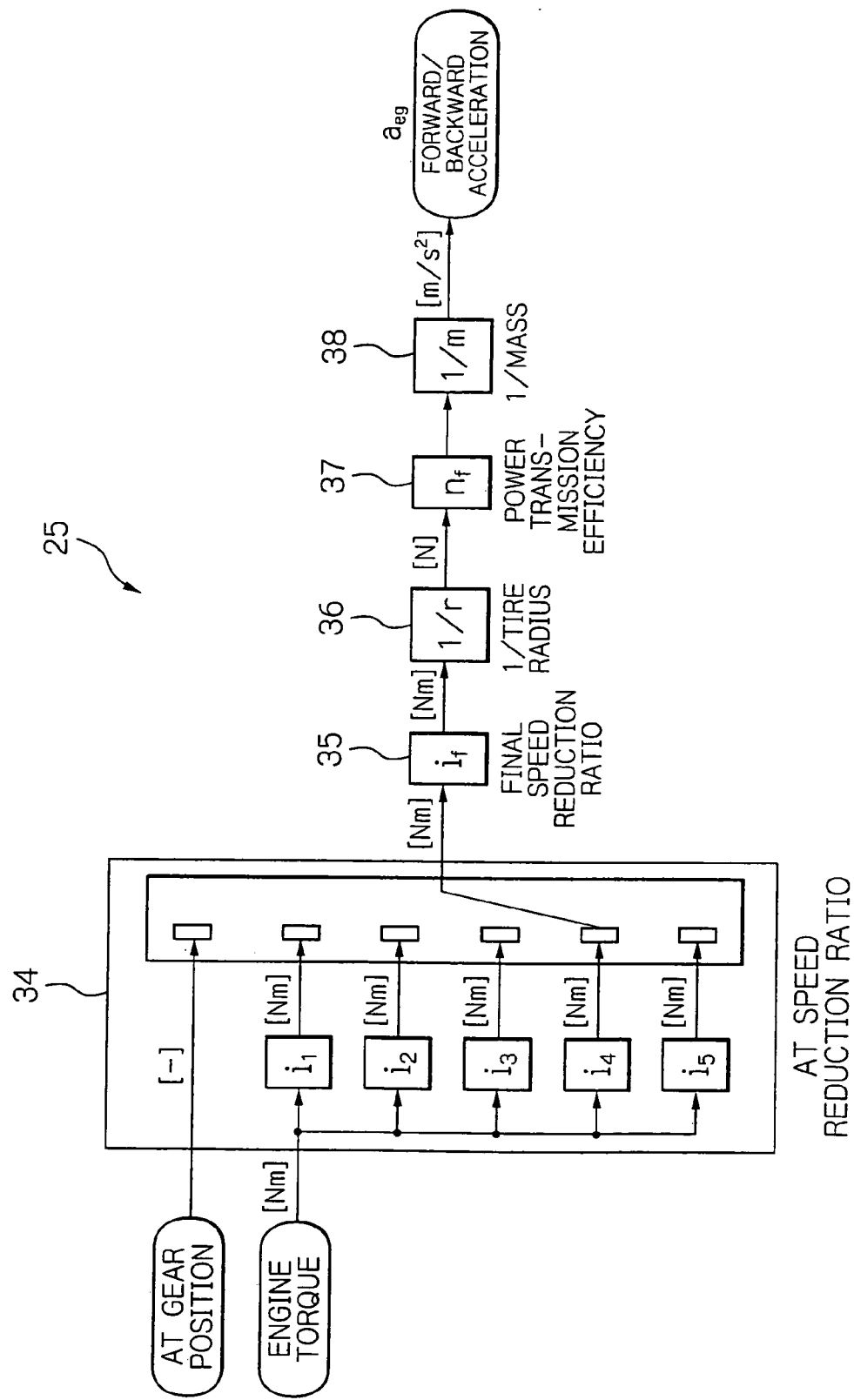
FIG. 4 is a block diagram illustrating a control function of an engine-caused forward/backward acceleration estimating unit shown in FIG. 3.
Figure 5:
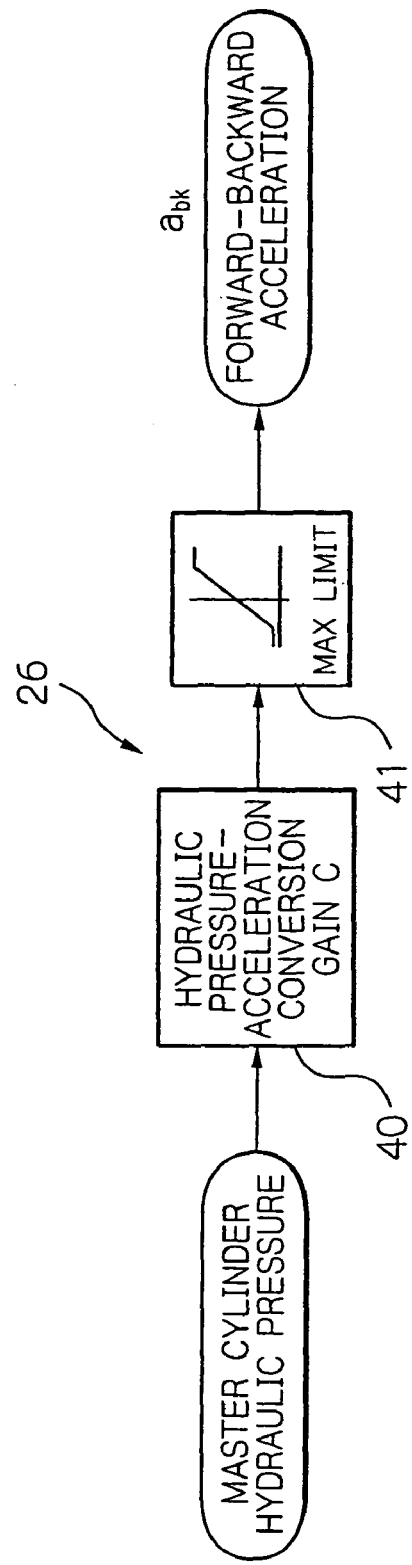
FIG. 5 is a block diagram illustrating a control function of a unit for estimating a forward/backward acceleration caused by a brake hydraulic pressure (hydraulic-pressure-caused forward/backward acceleration estimating unit) shown in FIG. 3.
Figure 6:
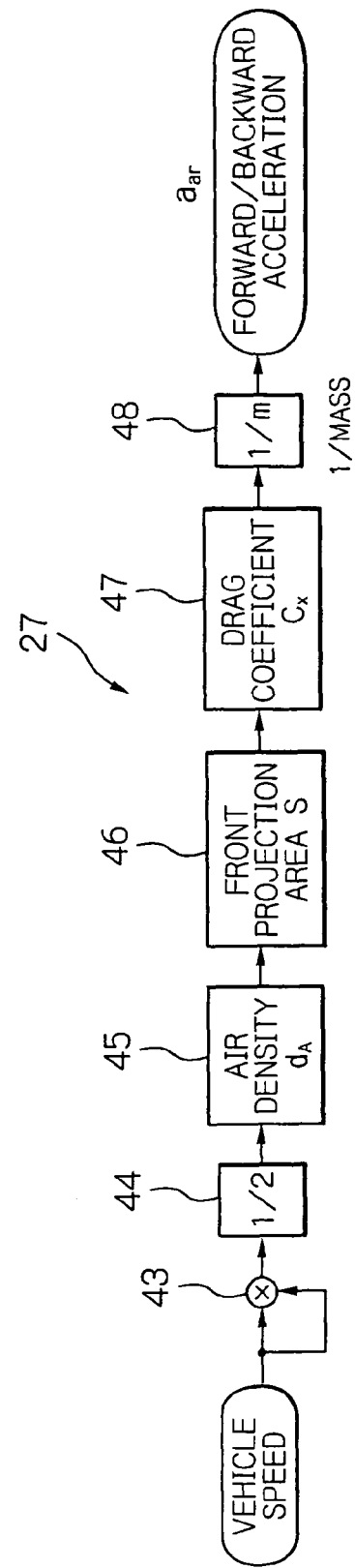
FIG. 6 is a block diagram illustrating a control function of a unit for estimating a forward/backward acceleration caused by an air resistance (air-resistance-caused forward/backward acceleration estimating unit) shown in FIG. 3

FIG. 1 is a perspective view schematically illustrating a layout of components of a vehicle provided with the suspension control apparatus of the second embodiment of the present invention. FIG. 2 is a block diagram illustrating a control function of a control apparatus in the vehicle shown in FIG. 1. FIG. 3 is a block diagram illustrating a forward/backward acceleration estimating unit shown in FIG. 2. FIG. 4 is a block diagram illustrating a control function of an engine-caused forward/backward acceleration estimating unit shown in FIG. 3. FIG. 5 is a block diagram illustrating a control function of a brake-hydraulic-pressure-caused forward/backward acceleration estimating unit shown in FIG. 3. FIG. 6 is a block diagram illustrating a control function of an air-resistance-caused forward/backward acceleration estimating unit shown in FIG. 3.

Referring to FIGS. 1 and 2, the suspension control apparatus 1 of the second embodiment is mounted on a vehicle 2 which employs the rear-wheel drive system [front engine/rear drive (FR)] and the AT transmission (automatic transmission). Damping force adjustable shock absorbers (hereinafter also referred to as "shock absorbers") 4FL, 4FR, 4RL and 4RR are mounted on the respective wheels [front left and right wheels 3FL and 3FR, and rear left and right wheels 3RL and 3RR] of the vehicle 2. In the vehicle 2 of the present embodiment, the rear left and right wheels 3RL and 3RR serve as driving wheels, and the front left and right wheels 3FL and 3FR serve as driven wheels. In the front left and right wheels 3FL and 3FR (driven wheels), wheel speeds are easily changed by a pitch motion, compared to rear wheels connected to a power train. In the present embodiment, a suspension mechanism comprises the shock absorbers 4FL, 4FR, 4RL and 4RR (hereinafter the term "shock absorber 4" collectively means the shock absorbers).

A spring 5 is attached around the shock absorber 4. Hereinafter, the term "wheel 3" (or "tire 3") collectively means the wheels (the front left and right wheels 3FL and 3FR, and the rear left and right wheels 3RL and 3RR).

The spring 5 is disposed between a vehicle body 6 and each wheel 3 so as to support the vehicle body 6.

The vehicle 2 is provided with a CAN (Controller Area Network, vehicle 2 network). Signals from wheel speed sensors 7FL and 7FR for the two front wheels (the front left and right wheels 3FL and 3FR), and not-shown various detecting units [a vehicle speed detecting unit, an engine torque detecting unit, a gear position detecting unit, and a hydraulic pressure detecting unit] existing on the vehicle 2 are inputted to a control apparatus 8 via the CAN.

The signals (or information) from the various detecting units include wheel speeds "$vc_{FL}$", "$vc_{FR}$" of the front left and right wheels 3FL and 3FR, a vehicle speed "v", an engine torque "$T_e$", a gear position "$P_g$", a signal (or information)

indicating a brake master cylinder hydraulic pressure "$P_m$" outputted from the various detecting units. These signals (or information) are expressed by the corresponding symbols, for example, as "vehicle speed signal v (or vehicle speed information v)" and "engine torque signal $T_e$ (engine torque information $T_e$)", and include signals (or information) indicating wheel speeds $vc_{FL}$, $vc_{FR}$. Other signals (or information) that will be described later are also expressed in the same manner.

The control apparatus 8 performs a calculation process based on a predetermined control program, as will be described later, outputs a control instruction value obtained in the calculation process by using the above-described inputted data, and controls the damping force characteristics of the shock absorber 4.

In the present embodiment, as will be described later, an acceleration of the vehicle body 6 in the forward and backward direction is estimated by using signals that can be obtained via the CAN. Therefore, a sensor dedicated to this purpose is not needed so that cost can be reduced.

A structure and the calculation process of the control apparatus 8 will be described with reference to FIGS. 2 to 6.

As shown in FIG. 2, the control apparatus 8 comprises a forward/backward acceleration estimating unit 20 which is an example of a forward/backward motion calculating unit, a pitch rate estimating unit 21, and a control instruction calculating unit 22 which generates a control instruction value based on a pitch rate from the pitch rate estimating unit 21 and outputs the control instruction value to the shock absorber 4.

The forward/backward acceleration estimating unit 20 may be replaced with a forward/backward acceleration sensor which detects a forward/backward acceleration. If the forward/backward acceleration sensor is mounted on the vehicle 2, an output value thereof can be utilized through the CAN.

As shown in FIGS. 2 and 3, the forward/backward acceleration estimating unit 20 comprises a unit 25 for estimating a forward/backward acceleration caused by the engine (hereinafter referred to as "engine-caused forward/backward acceleration estimating unit), a unit 26 for estimating a forward/backward acceleration caused by the brake master cylinder hydraulic pressure "$P_m$" (hereinafter referred to as "hydraulic-pressure-caused forward/backward acceleration estimating unit"), a unit 27 for estimating a forward/backward acceleration caused by air resistance (hereinafter referred to as "air-resistance-caused forward/backward acceleration estimating unit") 27, first and second adding units 28 and 29, and an estimated forward/backward acceleration switching unit 30. As will be describe later, the forward/backward acceleration estimating unit 20 estimates a forward/backward acceleration of the vehicle body 6 based on the vehicle speed "v", the engine torque "$T_e$", the gear position "$P_s$" and the brake master cylinder hydraulic pressure "$P_m$". Hereinafter, a forward/backward acceleration determined by this estimation process is called an estimated forward/backward acceleration "$a_{es}$". The estimated forward/backward acceleration "$a_{es}$" is inputted to the pitch rate estimating unit 21.

The pitch rate estimating unit 21 comprises a wheel-speed time-rate-of-change calculating unit 31, and a calculating unit 32. The wheel-speed time-rate-of-change calculating unit 31 receives inputs of wheel speeds from the wheel speed sensors 7FL and 7FR for the front left and right wheels 3FL and 3FR (driven wheels) to calculate an average value of the wheel speeds "$vc_{FL}$" and "$vc_{FR}$" of the wheel speed sensors 7FL and 7FR for the front left and right wheels 3FL and 3FR [($vc_{FL}$+$vc_{FR}$)/2], and calculates (estimates) a time-rate-of-change of the average value (hereinafter referred to as "wheel-speed time-rate-of-change"). The wheel-speed time-rate-of-change calculating unit 31 is a differentiator, and calculates the time-rate-of-change by differentiating the wheel speed of the wheel speed sensors 7FL and 7FR. The wheel-speed time-rate-of-change calculating unit 31 is one of components of a dimension converting unit of the present invention.

The wheel-speed time-rate-of-change may be calculated (estimated) by calculating time-rate-of-changes of the wheel speeds "$vc_{FL}$" and "$vc_{FR}$" and calculating the average value of them as the wheel-speed time-rate-of-change. Alternatively, the wheel-speed time-rate-of-change may be calculated from one of the wheels. In this case, a calculation load can be reduced.

The calculating unit 32 subtracts the estimated forward/backward acceleration "$a_{es}$" outputted from the forward/backward acceleration estimating unit 20 from the wheel-speed time-rate-of-change [wheel-speed time-rate-of-change—estimated forward/backward acceleration $a_{es}$], obtain a pitch rate by integrating the data obtained from the subtraction process, and outputs the obtained pitch rate to the control instruction calculating unit 22.

Since influence of acceleration/deceleration of the vehicle body 6 caused by the engine or the brake is canceled by performing the subtraction "wheel-speed time-rate-of-change—estimated forward/backward acceleration $a_{es}$", it is possible to estimate a pitch motion of the vehicle 2 at any time, and effectively perform an oscillation restraint control, regardless of influence of acceleration/deceleration of the vehicle body 6 caused by the engine or the brake.

Since it is possible to estimate a pitch motion of the vehicle 2 at any time regardless of sudden acceleration/deceleration of the vehicle body 6, it is possible to effectively control a pitch of the vehicle 2 by controlling a damping coefficient of the shock absorber 4 according to the pitch motion.

Since influence of acceleration/deceleration of the vehicle body 6 is canceled in the pitch rate estimating unit 21, pitch rate estimation accuracy can be improved.

When forward/backward acceleration information can not be obtained from the CAN (vehicle network), it is possible to estimate a pitch motion of the vehicle 2 by estimating a forward/backward acceleration with use of various signals obtained from an ECU of another system via the CAN, and subtracting the forward/backward acceleration from a wheel speed, without a cost increase, regardless of influence of acceleration/deceleration of the vehicle body 6 caused by the engine and the brake.

In addition, the pitch rate estimating unit 21 calculates a pitch rate with use of the wheel speed sensors 7FL and 7FR for the front left and right wheels 3FL and 3FR, i.e., wheel speeds of the driven wheels. Therefore, it is possible to clearly determine a change in wheel speeds induced by a pitch motion, which may be difficult when wheel speeds of the rear wheels (driving wheels) connected to the power train are used, and therefore becomes possible to improve calculation accuracy to improve accuracy of the oscillation restraint control.

The engine-caused forward/backward acceleration estimating unit 25 calculates a forward/backward acceleration "$a_{eg}$" caused by the engine (hereinafter referred to as "engine-caused forward/backward acceleration") based on the engine torque "$T_e$" and the gear position "$P_g$" obtained via the CAN.

The hydraulic-pressure-caused forward/backward acceleration estimating unit 26 calculates a forward/backward acceleration "$a_{bk}$" caused by the brake (hereinafter referred to as "brake-caused forward/backward acceleration") based on the brake master cylinder pressure "$P_m$" obtained via the CAN.

The air-resistance-caused forward/backward acceleration estimating unit 27 calculates a forward/backward acceleration "$a_{ar}$" caused by air resistance (hereinafter referred to as "air-resistance-caused forward/backward acceleration") based on the vehicle speed "v" $P_m$" obtained via the CAN.

The first adding unit 28 adds the air-resistance-caused forward/backward acceleration "$a_{ar}$" and brake-caused forward/backward acceleration "$a_{bk}$", and outputs the result to the second adding unit 29. The second adding unit 29 adds the data ($a_{ar}+a_{bk}$) outputted from the first adding unit 28 and the engine-caused forward/backward acceleration "$a_{eg}$", and outputs the data ($a_{ar}+a_{bk}+a_{eg}$) obtained by this addition as a total forward/backward acceleration "$a_{to}$" to the estimated forward/backward acceleration switching unit 30.

The estimated forward/backward switching unit 30 determines whether the vehicle speed "v" is 0 km/h or the vehicle speed "v" is more than 0 km/h. If determining that the vehicle speed "v" is 0 km/h, then the unit 30 sets 0 [m/s²] as the estimated forward/backward acceleration "$a_{es}$", and outputs it to the pitch rate estimating unit 21. If determining that the vehicle speed "v" is more than 0 km/h, then the unit 30 sets the total forward/backward acceleration "$a_{to}$" obtained from the second adding unit 29 as the estimated forward/backward acceleration "$a_{es}$", and outputs it to the pitch rate estimating unit 21.

As shown in FIG. 4, the engine-caused forward/backward acceleration estimating unit 25 comprises an AT speed reduction ratio calculating unit 34, a final speed reduction ratio multiplying unit 35, a tire radius dividing unit 36, a power transmission efficiency multiplying unit 37 and a vehicle body mass dividing unit 38. Generally, a driving force on an outer circumferential side of the driving wheel can be expressed by the following equation (1) when a rotation of the engine is transmitted to the driving wheel. Then, the forward/backward acceleration caused by engine driving, i.e., engine-caused forward/backward acceleration can be expressed by the following equation (2) by taking the vehicle body mass into consideration. The engine-caused forward/backward acceleration estimating unit 25 calculates the engine-caused forward/backward acceleration "$a_{eg}$" by utilizing the equations (1) and (2).

Thus, the engine-caused forward/backward acceleration "$a_{eg}$" is calculated as follows.

A driving force "P" [N] on the outer circumferential side of the driving wheel is generally expressed by the following equation (1).

$$P = i \times n_t \times T_e / R_t \, [N] \quad (1)$$

i: total speed reduction ratio
$n_t$: power transmission efficiency
$T_e$: engine torque [Nm]
$R_t$: radius of tire (wheel 3) [m]

Therefore, the engine-caused forward/backward acceleration "$a_{eg}$" can be obtained by calculating the driving force P with use of the equation (1), and introducing influence of the wheel body mass "m" [Kg] into the thus-calculated driving force "P" with use of the following equation (2).

$$a_{eg} = P/m \, [m/s^2] \quad (2)$$

As shown in FIG. 4, the engine-caused forward/backward acceleration estimating unit 25 calculates the engine-caused forward/backward acceleration "$a_{eg}$" by utilizing the equation (2).

More specifically, in the engine-caused forward/backward acceleration estimating unit 25, the AT speed reduction ratio calculating unit 34 multiplies the engine torque signal "$T_e$" by the speed reduction ratio determined based on the gear position signal "$P_g$" obtained via the CAN, and then outputs the product to the final speed reduction ratio multiplying unit 35.

The final speed reduction ratio multiplying unit 35 multiplies the output data of the AT speed reduction ratio calculating unit 34 by a final speed reduction ratio "$i_f$", and outputs the product to the tire radius dividing unit 36.

The tire radius dividing unit 36 calculates the driving force (driving force [N]=torque [Nm]/tire radius [m]) by dividing the output data of the final speed reduction ratio multiplying unit 35 by the tire radius "$R_t$" [m] (in other words, multiplying by $1/R_t$), and outputs the result to the power transmission efficiency multiplying unit 37.

The power transmission efficiency multiplying unit 37 multiplies the driving force by the power transmission efficiency "$n_t$", and then outputs the result to the vehicle body mass dividing unit 38.

The vehicle body mass dividing unit 38 calculates the engine-caused forward/backward acceleration "$a_{eg}$" by dividing the output data of the tire radius dividing unit 36 by the vehicle body mass "m" [Kg] (in other words, multiplying by 1/m).

As shown in FIG. 5, the hydraulic-pressure-caused forward/backward acceleration estimating unit 26 comprises an acceleration/hydraulic pressure conversion gain multiplying unit 40, and a MAX limiting unit 41.

Generally, a brake force "B" of the vehicle 2 equipped with a disk brake can be calculated by the following equation (3). More simply, the brake force "B" can be calculated by the following equation (4) if the master cylinder hydraulic pressure "$P_m$" can be detected. The hydraulic-pressure-caused forward/backward acceleration estimating unit 26 calculates the brake-caused forward/backward acceleration "$a_{bk}$" by utilizing the equations (3) or (4).

The brake-caused forward/backward acceleration "$a_{bk}$" is calculated as follows.

Generally, the brake force "B" of the vehicle 2 equipped with the disk brake is expressed by the following equation (3).

$$B = (2\mu \times A_w \times F \times K \times r)/(R_t \times A_m) \quad (3)$$

B: brake force [N]
μ: frictional coefficient between the disk rotor and the pad
$A_w$: cross-section area of the wheel cylinder [m²]
F: pressing force [N]
K: brake pedal ratio
r: effective radius of the disk rotor [m]
$R_t$: effective radius of tire [m]
$A_m$: cross-section area of the master cylinder [m²]

The brake force can be calculated by the equation (3), but calculation of the brake force can be simplified by the following equation (4) in the case that the master cylinder hydraulic pressure "$P_m$" can be detected.

$$B = P_m \times c \quad (4)$$

B: brake force [N]
$P_m$: master cylinder hydraulic pressure $P_m$ [Pa]
C: constant number [N/Pa]

The brake-caused forward/backward acceleration "$a_{bk}$" [m/s²] is obtained by calculating the brake force with use of the equation (4), and introducing influence of the vehicle mass into the thus-calculated brake force as the following equation (5).

$$a_{bk} = B/m \, [m/s^2] \quad (5)$$

As shown in FIG. 5, the hydraulic-pressure-caused forward/backward acceleration estimating unit 26 calculates the brake-caused forward/backward acceleration "$a_{bk}$" by utilizing the equation (5).

More specifically, as shown in FIG. 5, in the hydraulic-pressure-caused forward/backward acceleration estimating unit 26, the acceleration/hydraulic pressure conversion gain multiplying unit 40 multiplies the master cylinder brake hydraulic pressure signal "$P_m$" obtained via the CAN by an acceleration/hydraulic pressure conversion gain, and outputs the result to the MAX limiting unit 41. The MAX limiting unit 41 sets an upper limit value, taking an actually reachable value 1.2 G as a maximum value, since an actual acceleration becomes less than an estimated acceleration when wheel lock occurs. The MAX limiting unit 41 limits the output data of the acceleration/hydraulic pressure conversion gain multiplying unit 40 by the upper limit vale to calculate the brake-caused forward/backward acceleration "$a_{bk}$".

As shown in FIG. 6, the air-resistance-caused forward/backward acceleration estimating unit 27 comprises a multiplying circuit 43, a gain multiplying unit 44, an air density multiplying unit 45, a front projection area multiplying unit 46, an air drag coefficient multiplying unit 47, and a mass dividing unit 48.

An air force and the moment thereof are proportional to the front projection area of the vehicle body 6 and the speed squared, and depend on the shape of the vehicle body 6, whereby a drag of air resistance can be expressed by the following equation (6). Then, the forward/backward acceleration "$a_{ar}$" caused by a drag of air resistance can be obtained by the following equation (7) by which the vehicle mass can be taken into account. The air-resistance-caused forward/backward acceleration estimating unit 27 calculates the air-resistance-caused forward/backward acceleration "$a_{ar}$" by utilizing the equations (6) and (7).

The air-resistance-caused forward/backward acceleration "$a_{ar}$" is calculated as follows.

A drag of air resistance is expressed by the equation (6).

$$F_x = C_x \cdot (1/2) \cdot d_A v^2 S \quad (6)$$

Fx: drag of air resistance [N]
S: front projection area [m²]
v: vehicle speed v (speed relative to atmosphere) [m/s]
$d_A$: air density [Kg/m³]
$C_x$: drag coefficient (air resistance coefficient)

The drag "Fx" [N] of air resistance is calculated by the equation (6), and then influence of the vehicle mass "m" [Kg] is introduced into the thus-calculated drag "Fx". In this way, the forward/backward acceleration caused by the drag of air resistance (air-resistance-caused forward/backward acceleration "$a_{ar}$" [m/s²]) can be obtained by the following equation (7)

$$a_{ar} = Fx/m \ [m/s^2] \quad (7)$$

The air-resistance-caused forward/backward acceleration estimating unit 27 calculates the air-resistance-caused forward/backward acceleration "$a_{ar}$" by utilizing the equation (7). More specifically, as shown in FIG. 6, in the air-resistance-caused forward/backward acceleration estimating unit 27, first the multiplying circuit 43 raises to the second power the data "v" indicating the vehicle speed signal "v" obtained via the CAN, and outputs the raised data to the gain multiplying unit 44. The gain multiplying unit 44 multiplies the output data of the multiplying circuit 43 by the gain (½), and outputs the resulting data to the air density multiplying unit 45. The air density multiplying unit 45 multiplies the output data of the gain multiplying unit 44 by the air density "$d_A$", and outputs the resulting data to the front projection area multiplying unit 46. The front projection area multiplying unit 46 multiplies the output data of the air density multiplying unit 45 by the front projection area "S", and outputs the resulting data to the air drag coefficient multiplying unit 47. The air drag coefficient multiplying unit 47 multiplies the output data of the front projection area multiplying unit 46 by the drag coefficient "$C_x$", and outputs the resulting data to the mass dividing unit 48. The mass dividing unit 48 divides the output data of the air drag coefficient multiplying unit 47 by the mass "m", and outputs the resulting data as the air-resistance-caused forward/backward acceleration "$a_{ar}$".

In the present embodiment, a pitch rate is calculated by the pitch rate estimating unit 21, and oscillation of the vehicle 2 is restrained by using the calculated pitch rate. Since the pitch rate estimating unit 21 takes acceleration and deceleration into account when estimating the pitch rate for creating the control instruction value, accurate estimation of pitch rate is possible as mentioned above, so that the suspension control apparatus 1 can perform an accurate oscillation restraint control of the vehicle 2.

In addition, since wheel speeds of the driven wheels (front left and right wheels 3FL and 3FR) are used in the pitch rate estimation by the pitch rate estimating unit 21, a change in wheel speeds induced by a pitch motion can be more clearly determined than an estimation using wheel speeds of the driving wheels, so that calculation accuracy can be improved. Therefore, the suspension control apparatus 1 can more accurately perform an oscillation restraint control.

In addition, since the calculating unit 32 subtracts the estimated forward/backward acceleration "$a_{es}$" from the wheel-speed time-rate-of-change, it is possible to cancel influence of acceleration and deceleration of the vehicle body 6 caused by the engine and brake. Therefore, it is possible to estimate a pitch motion of the vehicle 2 at any time and effectively perform an oscillation restraint control, regardless of influence of acceleration and deceleration of the vehicle body 6 caused by the engine and brake.

In the present embodiment, values of acceleration are used for subtraction operation. However, a motion in another dimension, such as a wheel speed and a forward/backward speed of the vehicle body, may be used for subtraction operation.

In the present embodiment, the suspension control apparatus 1 is employed in the vehicle 2 using the AT transmission system, and therefore the AT speed reduction ratio calculating unit 34 calculates the speed reduction ratio. However, the suspension control apparatus 1 may be employed in the vehicle 2 using the MT (manual transmission) system. In this case, the AT speed reduction ratio calculating unit 34 may be replaced by a MT speed reduction ratio calculating unit. Alternatively, the suspension control apparatus 1 may be employed in the vehicle 2 using the CVT (Continuously Variable Transmission) system. In this case, the AT speed reduction ratio calculating unit 34 may be replaced by a CVT speed reduction ratio calculating unit.

Efficiency of the torque converter (slip) may be also taken into account in speed reduction ratio calculation, which can improve accuracy of speed reduction ratio calculation.

When the vehicle 2 is embodied by a hybrid car, a sum of the engine torque and a motor torque can be used in the forward/backward acceleration estimation, instead of the engine torque alone. When the vehicle 2 is embodied by an electric car, a motor torque can be used in the forward/backward acceleration estimation, instead of the engine torque.

In the present embodiment, when time-rate-of-changes of wheel speeds of the left and right wheels 3 are in opposite phases, it may be determined that the vehicle is running on a rough road, and the wheel-speed time-rate-of-change calculating unit 31 may stop its calculation. By this arrangement, it is possible to prevent an unnecessary control.

In the present embodiment, information on slip and lockup of the torque converter may be used when the forward/backward acceleration estimating unit 20 estimates the estimated forward/backward acceleration "$a_{es}$". By this arrangement, it is possible to more improve estimation accuracy.

In the present embodiment, the forward/backward acceleration estimating unit 20 (forward/backward acceleration estimating unit) estimates a forward/backward acceleration with use of information obtained via the CAN, such as the vehicle speed "v", the engine torque "$T_e$", the gear position "$P_g$", and the master cylinder hydraulic pressure "$P_m$". However, the forward/backward acceleration estimating unit 20 may estimate the forward/backward acceleration based on positional change information obtained from the GPS, instead of the information obtained from the CAN. For example, an average speed can be calculated by measuring positions of the vehicle at a predetermined time interval while the vehicle is running, and a change in the wheel speed, i.e., a pitch rate can be calculated by subtracting the calculated average speed from the wheel speed.

In the present embodiment, the suspension control apparatus 1 comprises the forward/backward acceleration estimating unit 20 which estimates a forward/backward acceleration of the vehicle body 6 with use of information obtained via the CAN, such as the vehicle speed "v", the engine torque "$T_e$", the gear position "$P_g$", and the master cylinder hydraulic pressure "$P_m$". However, instead of the forward/backward acceleration estimating unit 20, the suspension control apparatus may comprise an acceleration sensor which directly detects an forward/backward acceleration acting on the vehicle body 6, such as a semiconductor acceleration sensor, a strain gauge acceleration sensor or a piezoelectric acceleration sensor. By provision of such an acceleration sensor, a forward/backward acceleration can be directly measured so that a pitch rate can be more accurately estimated.

In the present embodiment, the forward/backward acceleration estimating unit 20 may estimate a forward/backward acceleration, taking into account influence of an external force such as a wind pressure acting on the vehicle 2, a tilt of the vehicle 2, and an angle of a surface on which the vehicle 2 is running. In this case, it is possible to calculate a forward/backward acceleration, reflecting running conditions of the vehicle 2, whereby it is possible to perform an oscillation restraint control of the vehicle 2 according to conditions similar to actual surroundings of the vehicle 2 so that accuracy of the oscillation restraint control can be improved.

Third Embodiment

Figure 7:
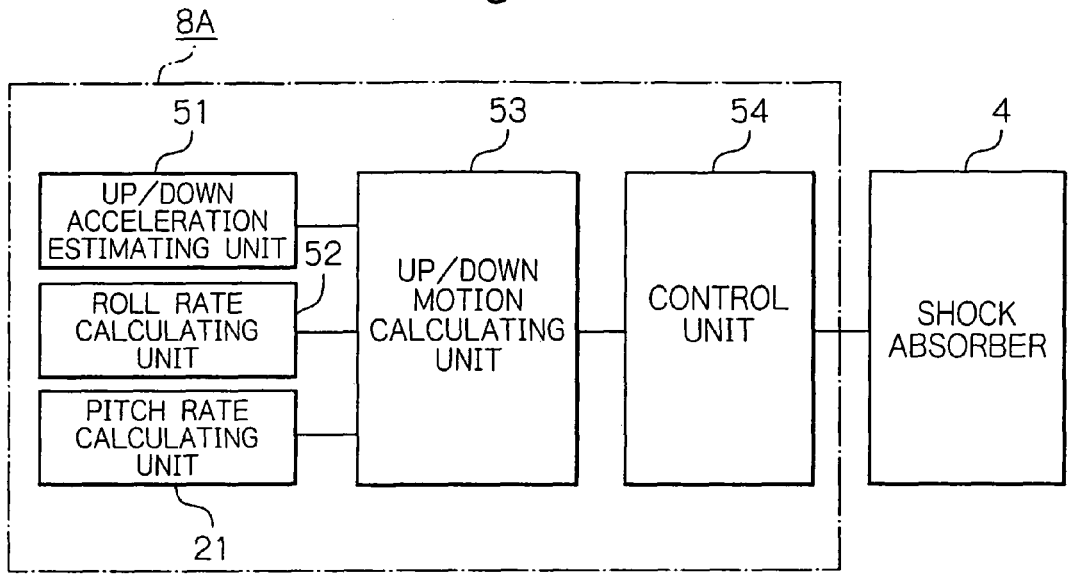
FIG. 7 is a block diagram schematically illustrating a control apparatus 8A in a suspension control apparatus of a third embodiment of the present invention.

The control apparatus 8 in the above-mentioned embodiment may be replaced by a control apparatus 8A comprising the pitch rate estimating unit 21 as mentioned above, an up/down acceleration estimating unit (first up/down motion calculating unit) 51 operable to estimate an up/down acceleration of the vehicle body 6, a roll rate calculating unit (roll motion estimating unit) 52 operable to calculate (estimate) a roll rate of the vehicle body 6, an up/down motion calculating unit 53 operable to calculate up/down motions of various portions of the vehicle body 6 from the up/down acceleration, the roll rate and the pitch rate, and a controller 54 operable to send a predetermined instruction based on the calculated up/down motion to the shock absorber 4, as shown in FIG. 7.

According to the third embodiment, the pitch rate calculating unit 21 calculates a pitch rate with accuracy as in the second embodiment. The up/down motion calculating unit 53 obtains an up/down motion signal by calculating up/down motions of the various portions of the vehicle body 6 based on the pitch rate obtained by the pitch rate calculating unit 21, the up/down acceleration obtained by the up/down acceleration estimating unit 51, and the roll rate obtained by the roll rate calculating unit 52, and outputs the up/down motion signal to the controller 54. The controller 54 creates a control instruction value according to the up/down motion signal, and inputs the control instruction value to the absorber 4 so that an oscillation restraint control is performed.

As mentioned above, since it is possible to accurately calculate a pitch rate used in creating an instruction for oscillation restraint control, it is possible to improve accuracy of oscillation restraint control of the vehicle 2. Further, the control instruction value is calculated taking into account the up/down acceleration and the roll rate, in addition to the pitch rate. Since the control instruction value is calculated while influence of the up/down acceleration and the roll rate acting on the vehicle 2 is reflected, it is possible to improve calculation accuracy and therefore improve accuracy of oscillation restraint control of the vehicle 2.

Fourth Embodiment

Figure 8:
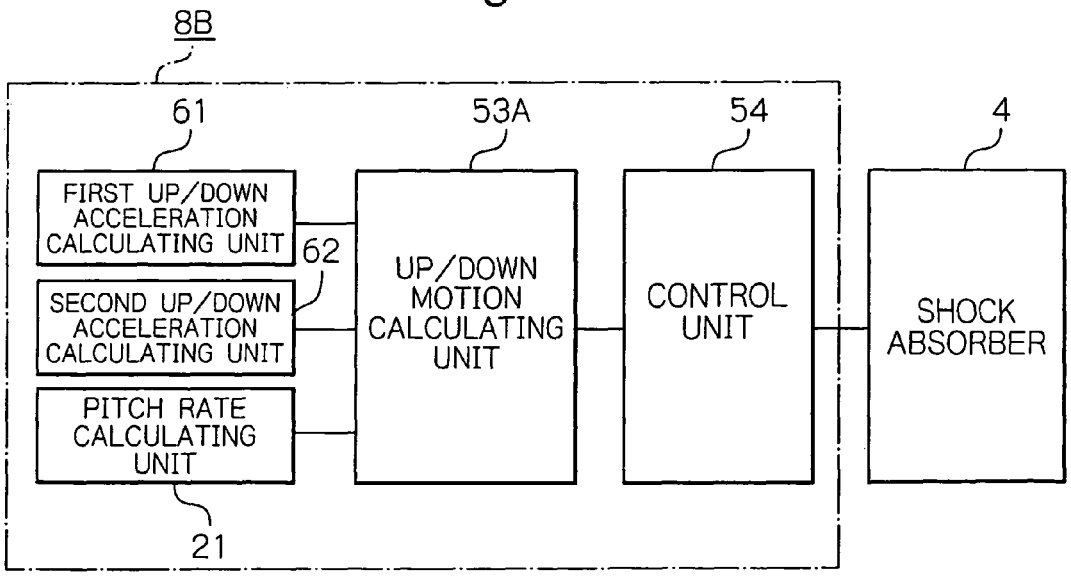
FIG. 8 is a block diagram schematically illustrating a control apparatus 8B in a suspension control apparatus of a fourth embodiment of the present invention.

The control apparatus 8 may be replaced with a control apparatus 8B comprising, as shown in FIG. 8, a first up/down acceleration calculating unit 61 operable to calculate an up/down acceleration at a first point of the vehicle body 6 and a second up/down acceleration calculating unit 62 operable to calculate an up/down acceleration at a second point of the vehicle body 6, instead of the up/down acceleration estimating unit 51 and the roll rate calculating unit 52 in the third embodiment which roll rate calculating unit 52 calculates (estimates) the roll rate of the vehicle body 6. As shown in FIG. 8, the control apparatus 8B further comprises an up/down motion calculating unit 53A operable to calculate up/down motions of various portions of the vehicle body 6 based on the up/down accelerations of the first and second points and the pitch rate, instead of the up/down motion calculating unit 53 which calculates the up/down motions of the various portions of the vehicle body 6 based on the up/down acceleration, the roll rate and the pitch rate.

According to the fourth embodiment, the pitch rate calculating unit 21 calculates a pitch rate with accuracy as mentioned above. The up/down motion calculating unit 53A obtains up/down motion signals by calculating up/down motions of the various portions of the vehicle body 6 based on the first up/down acceleration of the vehicle body 6 obtained by the first up/down acceleration calculating unit 61 and the second up/down acceleration of the vehicle body 6 obtained by the second up/down acceleration calculating unit 62, and outputs the obtained up/down motion signals to the controller 54. The controller 54 creates control instruction values according to the up/down motion signals, and inputs the created control instruction values to the shock absorbers 4 so that damping force adjustment, therefore an oscillation restraint control can be performed.

As mentioned above, since it is possible to accurately calculate a pitch rate that is used in creating an instruction for the oscillation restraint control, it is possible to improve accuracy of the oscillation restraint control of the vehicle 2. Further, a control instruction value is calculated taking into account first and second up/down accelerations, in addition to a pitch rate that is used in creating the instruction. Since the control instruction value is calculated while influence of the first and second up/down accelerations acting on the vehicle 2 is reflected, it is possible to improve calculation accuracy and therefore improve accuracy of the oscillation restraint control of the vehicle 2.

Hereinafter, the fourth embodiment of the present invention will be described in further detail with reference to FIGS. 9 to 18.

Figure 9:
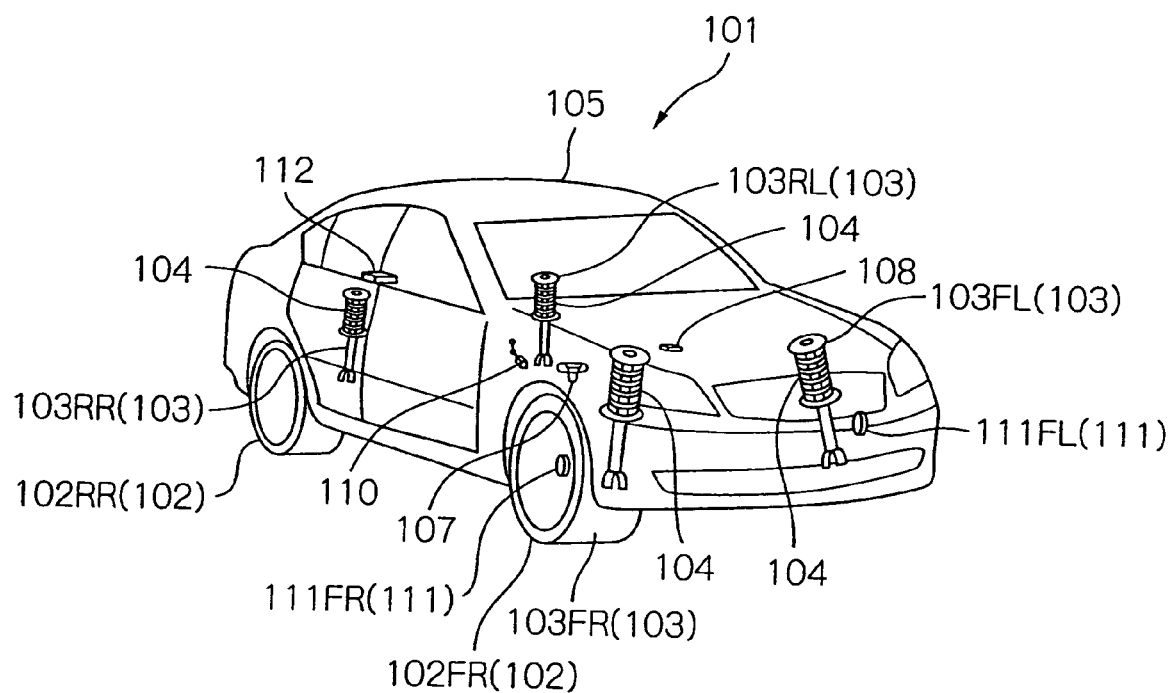
FIG. 9 is a perspective view schematically illustrating a layout of components of a vehicle provided with the suspension control apparatus of the fourth embodiment of the present invention.

FIG. 9 illustrates a typical layout of components of a vehicle 101 provided with the suspension control apparatus of the fourth embodiment of the present invention. As shown in FIG. 9, damping force adjustable shock absorbers (hereinafter referred to as "shock absorbers") 103 are mounted corresponding to wheels 102 (only a front right wheel 102FR and a rear right wheel 102 RR are shown in FIG. 9) of the vehicle 101. The shock absorber 103 will also be referred to as "front right wheel shock absorber 103FR", "rear right wheel shock absorber 103RR", "front left wheel shock absorber 103FL", or "rear left wheel shock absorber 103RL" according to a situation or discussed one of the wheels 102. Signals such as a sprung speed and a sprung relative speed, and various members are also referred to in the same manner as the shock absorber 103 according to a situation or associated one of the wheels 102.

A spring 104 is attached around the shock absorber 103. The shock absorber 103 and the spring 104 are interposed between a vehicle body 105 and the associated wheel 102 so as to serve to damp an up/down motion of the associated wheel 102. A sprung acceleration sensor 107 (sprung motion detecting unit) is attached to the vehicle body 105 for detecting an up/down acceleration (sprung up/down motion) acting on the portion of the vehicle body 105 corresponding to the front right wheel 102FR. Further, a forward/backward acceleration sensor 108 is attached to the vehicle body 105 for detecting a forward/backward acceleration acting on the vehicle body 105. Further, a vehicle height sensor 110 is attached to the vehicle body 105 at the portion of the vehicle body 105 corresponding to the rear left wheel 102RL (not shown) (hereinafter referred to as "rear left wheel portion of the vehicle body") for detecting a height level of the vehicle 101. Further, wheel speed sensors 111 are provided to the vehicle 101 for detecting rotational speeds of the front left and right wheels 102FL and 102FR (only the front right wheel 102FR is shown) (the wheel speed sensor 111 is hereinafter referred to as "wheel speed sensor 111FR" or "111FL", corresponding to the front left wheel 102FL or the front right wheel 102FR).

The vehicle height sensor 110, along with a sprung speed estimating circuit 115 which will be described later, forms a sprung motion detecting unit of the present invention.

A controller (controlling unit) 112 is connected to the sprung acceleration sensor 107, the forward/backward acceleration sensor 108, the vehicle height sensor 110 and the wheel speed sensor 111. The controller 112 receives inputs of information from the connected members, and calculates a pitch motion, a warp motion, a roll motion and a bounce motion of the vehicle body 105, up/down speeds at the positions of the wheels, and relative speeds "vs" between the wheels 102 and the vehicle body 105 according to a calculation process which will be described later. Then, the controller 112, according to the calculation result, calculates control instruction values (damping force instruction values) based on the skyhook control theory. The controller 112 controls the shock absorbers 103 in this way. The up/down speed at the wheel position correspond to "sprung motion" of the present invention, and are also referred to as "sprung speed v", and may be also referred to as "vehicle-body-front-right-wheel-portion sprung speed vFR", "vehicle-body-rear-right-wheel-portion sprung speed vRR", "vehicle-body-front-left-wheel-portion sprung speed vFL", or "vehicle-body-rear-left-wheel-portion sprung speed vRL" according to a situation. The relative speed "vs" may be also referred to as "front-right-wheel relative speed vsFR", "rear-right-wheel relative speed vsRR", "front-left-wheel relative speed vsFL" or "rear-left-wheel relative speed vsRL".

Figure 10:
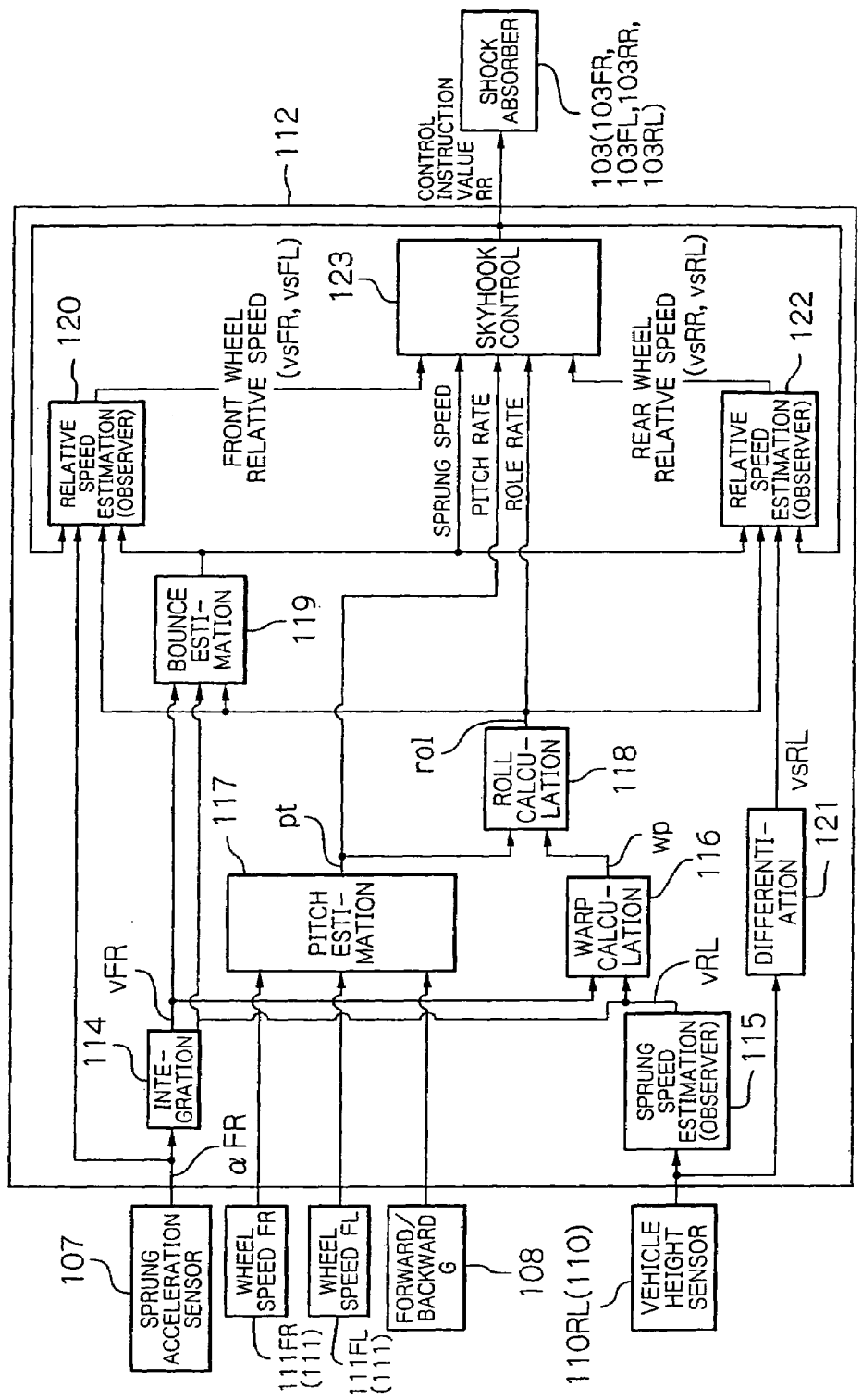
FIG. 10 is a block diagram illustrating a structure of a controller in the vehicle shown in FIG. 9.

As shown in FIG. 10, the controller 112 comprises an integrator circuit 114, a sprung speed estimating circuit 115 including an observer, a warp calculating unit 116, a pitch estimating unit 117, a roll calculating unit 118, a bounce estimating unit 119, a front wheel relative speed estimating unit 120 including an observer, a differentiator circuit 121, a rear wheel relative speed estimating unit 122 including an observer, and a skyhook control unit 123.

The integrator circuit 114 integrates an acceleration (sprung acceleration) "αFR" at the vehicle body front right wheel portion detected by the sprung acceleration sensor 107 to calculate an absolute up/down speed (sprung speed) "vFR" at the vehicle body front right wheel portion, and inputs the calculated data to the bounce estimating unit 119 and the warp calculating unit 116. The acceleration (sprung acceleration) "αFR" at the vehicle body front right wheel portion detected by the sprung acceleration sensor 107 is inputted to the front wheel relative speed estimating unit 120.

The sprung speed estimating circuit 115 receives an input about a vehicle height of the vehicle body rear left wheel portion detected by the vehicle height sensor 110, and carries out a simulation with use of a predetermined model. Then, the circuit 115 estimates an absolute up/down speed (sprung speed) "vRL" at the vehicle body rear left wheel portion, and inputs the estimated data to the warp calculating unit 116 and the bounce estimating unit 119. The differentiator circuit 121 is connected to the vehicle height sensor 110 so that the circuit 121 differentiate the data detected by the vehicle height sensor 110 to calculate the relative speed "vsRL" at the rear left wheel, and inputs the calculated data to the rear wheel relative speed estimating unit 122.

The warp calculating unit 116 calculates a difference between the sprung speed "vFR" at the vehicle body front right wheel portion inputted from the integrator circuit 114, and the sprung speed "vRL" at the vehicle body rear left wheel portion inputted from the sprung speed estimating circuit 115 to obtain a warp "wp". Then the unit 116 inputs the obtained data (warp "wp") to the roll calculating unit 118.

The pitch estimating unit 117 estimates a pitch rate "pt" with use of the wheel speeds of the front left and right wheels 102FL and 102FR detected by the wheel speed sensors 111FR and 111FL, and the forward/backward acceleration detected by the forward/backward acceleration sensor 108, and inputs the estimated data (pitch rate "pt") to the roll calculating unit 118 and the skyhook control unit 123.

The roll calculating unit 118 calculates a difference between the calculation results of the warp calculating unit 116 and the pitch estimating unit 117 to obtain a roll rate "rol", and inputs the obtained data (roll rate "rol") to the bounce estimating unit 119, the front wheel relative speed estimating unit 120, the rear wheel relative speed estimating unit 122, and the skyhook control unit 123.

The bounce estimating unit 119 calculates sprung speeds (vFR, vRL, vFL, vRR) at the respective wheel positions, based on the sprung speed "vFR" at the vehicle body front right wheel portion obtained by the integrator circuit 114, the sprung speed "vRL" at the vehicle body rear left wheel portion obtained by the sprung speed estimating circuit 115, and the roll rate "rol" obtained by the roll calculating unit 118.

Then, the unit 119 inputs the calculated data to the front wheel relative speed estimating unit 120, the rear wheel relative speed estimating unit 122 and the skyhook control unit 123.

The front wheel relative speed estimating unit 120 receives inputs of the sprung acceleration "αFR" at the vehicle body front right wheel portion detected by the sprung acceleration sensor 107, the sprung speeds (vFR, vRL, vFL, vRR) at the respective wheel positions obtained by the bounce estimating unit 119, the inputted data (the acceleration at the vehicle body front right wheel portion), the roll rate "rol" calculated by the roll calculating unit 118, and the damping force instruction value outputted from the skyhook control unit 123. Then, the unit 120 estimates the relative speeds "vsFL" and "vsFR" between the respective front left and right wheels 102FL and 102FR and the vehicle body 105 (relative speeds at the vehicle body front left and right wheels 102FL and 102FR), based on the sprung acceleration "αFR" at the vehicle body front right wheel portion, by carrying out a simulation with use of a predetermined model. The unit 120 inputs the estimated data to the skyhook control unit 123.

The rear wheel relative speed estimating unit 122 receives inputs of the relative speed "vsRL" at the rear left wheel calculated by the differentiator circuit 121, the roll rate "rol" calculated by the roll calculating unit 118, the sprung speeds (vFR, vRL, vFL, vRR) at the respective wheel positions obtained by the bounce estimating unit 119, and the damping force instruction value outputted from the skyhook control unit 123. Then, the unit 122 estimates the relative speeds "vsRL" and "vsRR" between the respective rear left and right wheels 102RL and 102RR and the vehicle body 105 (relative speeds at the vehicle body rear left and right wheels 102RL and 102RR), based on the relative speed "vsRL" at the rear left wheel inputted from the differentiator circuit 121, by carrying out a simulation with use of a predetermined model. The unit 122 inputs the estimated data to the skyhook control unit 123.

The skyhook control unit 123 controls the shock absorbers 103 by creating the damping force instruction values to the shock absorbers 103 associated with the wheels 102, based on the predetermined skyhook control theory, with use of the sprung speeds at the respective wheel positions and the relative speeds between the respective wheels 102 and the vehicle body 105. The damping force instruction value is fed back to the front wheel relative speed estimating unit 120 and the rear wheel relative speed estimating unit 122 so that they are used in carrying out a simulation.

The components of the controller 112 will be further described.

Figure 11:
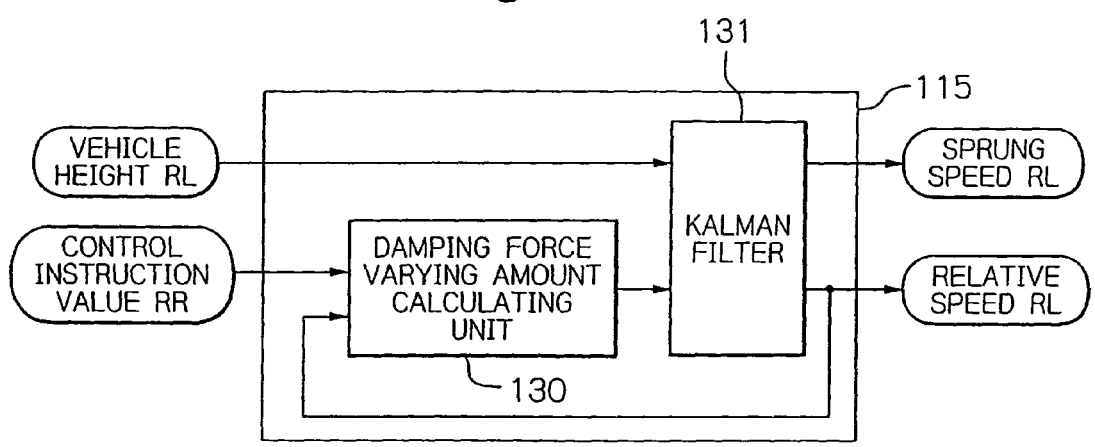
FIG. 11 is a block diagram illustrating a sprung speed estimating circuit shown in FIG. 10.

As shown in FIG. 11, the sprung speed estimating circuit 115 includes a damping force varying amount calculating unit 130 and a Kalman filter 131 (observer) in which the modern control theory is employed. The circuit 115 receives an input of the vehicle height at the vehicle body rear left wheel portion detected by the vehicle height sensor 110 as mentioned above, and carries out a simulation with use of a predetermined model to estimate an absolute up/down speed at the vehicle body rear left wheel portion (absolute sprung speed). The damping force varying amount calculating unit 130 receives inputs of the control instruction value to the shock absorber 103 RR of the rear right wheel and the calculated data of the Kalman filter 131 (relative speed "vsRL" at the rear left wheel portion) to calculate a damping force varying amount, and inputs the calculated data to the Kalman filter 131. In the present embodiment, the value calculated by the Kalman filter is used as the relative speed. However, the relative speed may be obtained by differentiating the value detected by the vehicle height sensor.

The content of the Kalman filter 131 is as follows.

Figure 12:
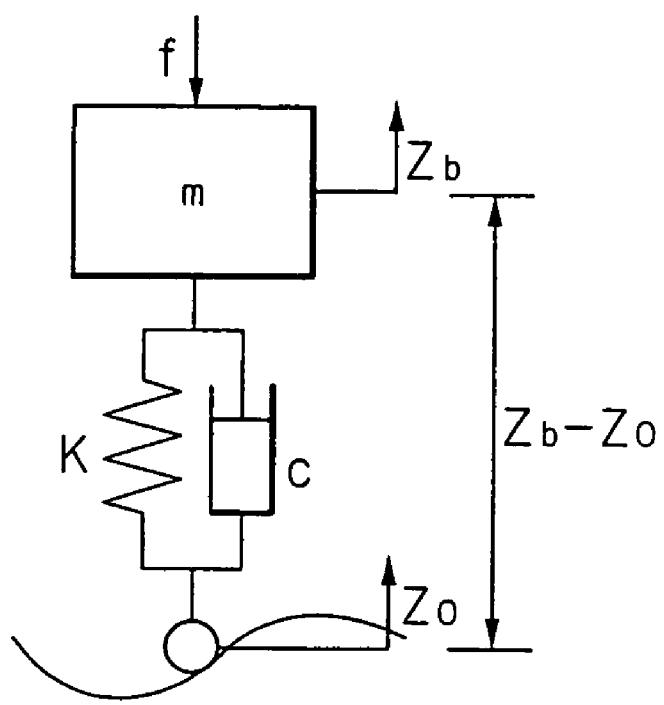
FIG. 12 illustrates an analytical model of an up/down oscillation of a ¼ vehicle body.

As shown in FIG. 12, a model of up/down motion of the vehicle body 105 is created. FIG. 12 shows an example of a ¼ vehicle model which is a model of up/down oscillation of the vehicle body 105 with one freedom degree. In the model of FIG. 12, "$Z_b$" represents an absolute up/down displacement of the vehicle body 105, "$Z_0$" represents an absolute up/down unsprung displacement, "k" represents a spring coefficient, "c" represents a damping coefficient, "f" represents an external force acting on the vehicle body 105, and "m" represents a mass of the vehicle body 105.

Therefore, a motion equation of this system is expressed by the equation (8)

[equation (8)]

$$m\ddot{z}_b = -k(z_b-z_0)-c(\dot{z}_b-\dot{z}_0)-f \quad (1)$$

If the equation (9) in which an unsprung and sprung relative displacement "$z_{20}$" is set as a state variable, and an absolute sprung speed is expressed by "$\dot{z}_b$" is provided to treat relative displacement as an observable output, the state equation is expressed by the equation (10).

[equation (9)]

$$z_{20}=z_b-z_0$$

[equation (10)]

$$\dot{x}(t)=Ax(t)+Bu(t)+Gw(t)$$

$$y(t)=Cx(t)+Du(t)+v(t) \quad (3)$$

Here, the state variable is

[equation (11)]

$$x=[\dot{z}_b z_{20}]^T$$

the output is a relative displacement $y=z_{20}$, the input is an external force acting on the vehicle body 5, i.e. u=f, and the disturbance is a road surface up/down speed expressed by equation (12).

[equation (12)]

$$w=\dot{z}_0$$

In addition, v(t) is an observation noise, and they are Gaussian white noises. Their averages and covariances are known, and expressed by the equation (13).

[equation (13)]

$$E[w(t)]=0, \; E[w(t)w^T(\sigma)]=Q\delta(t-\tau)$$

$$E[v(t)]=0, \; E[v(t)v^T(\tau)]=R\delta(t-\tau) \quad (4)$$

In addition, the equation (14) is presented.

[equation (14)]

$$A = \begin{bmatrix} -\frac{c}{m} & -\frac{k}{m} \\ 1 & 0 \end{bmatrix}, \quad (5)$$

$$B = \begin{bmatrix} -\frac{1}{m} \\ 0 \end{bmatrix}, \; G = \begin{bmatrix} \frac{c}{m} \\ -1 \end{bmatrix},$$

$$C = [0 \; 1], \; D = [0]$$

Therefore, since the relative displacement is observable, the equation (15) is obtained from the equation (10) as the observer.

[equation (15)]

$$\dot{\hat{x}} = A\hat{x} + Bu + L(y - C\hat{x}) \qquad (6)$$

Here, L is an observer gain. The observer gain "L" is solved by the Kalman, and is determined as indicated by the equation (17), from the positive symmetric solution P of the Riccati equation (16):

$$AP + PA^T - PC^T R^{-1} CP + Q = 0 \qquad (16)$$

$$L = PC^T R^{-1} \qquad (17)$$

It should be noted that, if the Kalman filter is employed in a system using a shock absorber as the second embodiment, the damping constant "c" in the equation (14) is a variable.

In the fourth embodiment, an actual damping force generated by the shock absorber 103 is estimated, with use of the damping force varying amount calculating unit 130, based on the relative speed obtained by differentiating the estimated relative displacement and the control instruction value of the controller 112. A disturbance observer is formed in which the estimated value of the damping force is inputted to a observer with an external force acting on the vehicle body 105 as "f", whereby a relative speed change caused by the damping force change can be canceled.

In the fourth embodiment, the sprung speed estimating circuit 115 comprises the Kalman filter, but another type of observer may be used.

Figure 13:
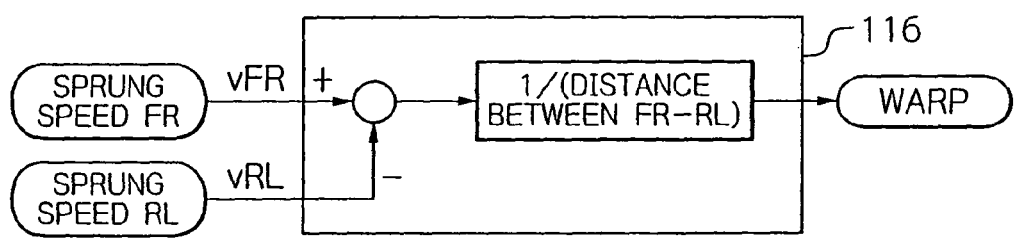
FIG. 13 is a block diagram illustrating a warp calculating unit shown in FIG. 10.

As shown in FIG. 13, the warp calculating unit 116 calculates a warp "wp" by calculating a difference (vFR-vRL) between the sprung speed "vFR" at the vehicle body front right wheel portion inputted from the integrator circuit 114 and the sprung speed "vRL" at the vehicle body rear left wheel portion inputted from the sprung speed estimating circuit 115, and dividing the calculated difference by the distance between them (distance between the vehicle body front right wheel portion and the vehicle body rear left wheel portion).

Figure 14:
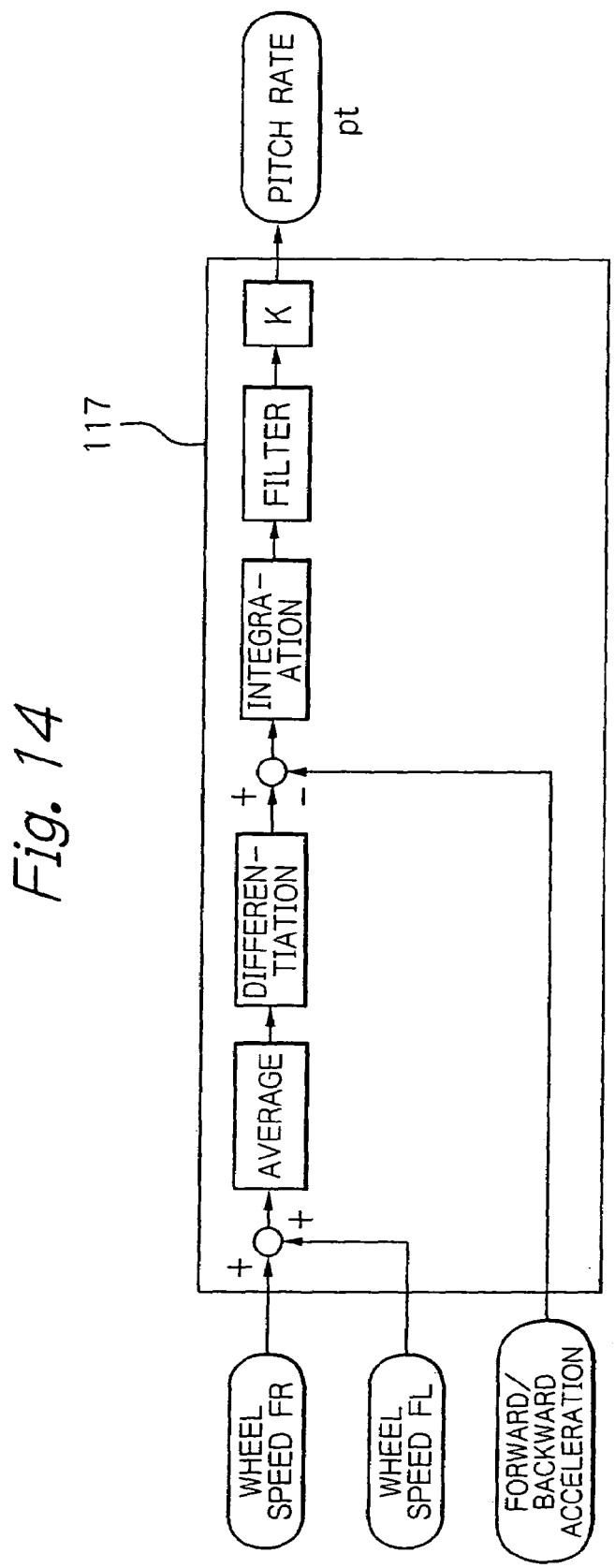
FIG. 14 is a block diagram illustrating a pitch estimating unit shown in FIG. 10.

As shown in FIG. 14, the pitch estimating unit 117 calculates a wheel acceleration by calculating an average value of the wheel speeds of the front left and right wheels 102FL and 102FR detected by the wheel speed sensors 111FR and 111FL, and differentiating the calculated average value. The unit 117 estimates a pitch rate "pt" by calculating a difference between the resulting wheel acceleration and the forward/backward acceleration detected by the forward/backward acceleration sensor 108, integrating the obtained signal, and performing filtering and amplifying processes. A vehicle speed change caused by acceleration and deceleration is canceled by calculating an average value of vehicle speeds of the vehicle body front left and right wheel portions.

Figure 15:
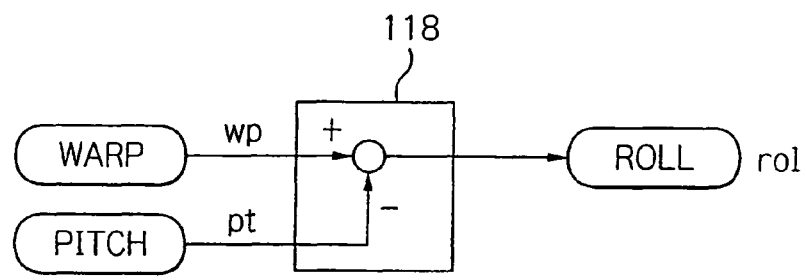
FIG. 15 is a block diagram illustrating a roll calculating unit shown in FIG. 10.

As shown in FIG. 15, the roll calculating unit 118 calculates a roll rate "rol" that is a roll component, by subtracting the pitch component "pt" estimated by the pitch estimating unit 117 from the warp "wp" calculated by the warp calculating unit 116.

Figure 16:
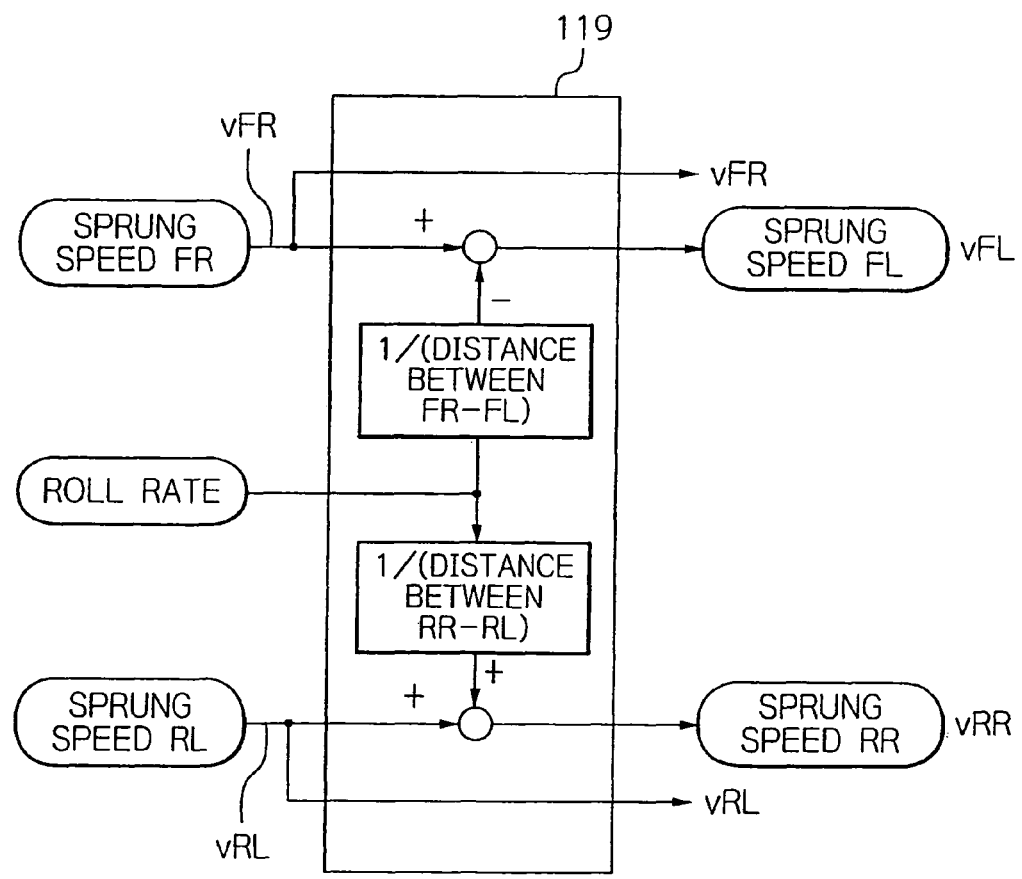
FIG. 16 is a block diagram illustrating a bounce estimating unit shown in FIG. 10.

As shown in FIG. 16, the bounce estimating unit 119 receives inputs of the sprung speeds "vFR" and "vRL" at the vehicle body front right wheel and rear left wheel portions, and calculates the sprung speeds "vFL" and "vRR" at the vehicle body front left wheel and rear right wheel portions by using the data "vFR" and "vRL" as mentioned below. In this way, the unit 119 obtains the sprung speeds "vFL", "vRR", "vFR" and "vRL" at the respective wheel positions, and thereby estimates the bounce motion of the vehicle body 105.

The sprung speed "vFL" at the vehicle body front left wheel portion is calculated based on the sprung speed "vFR" at the vehicle body front right wheel portion obtained by the integrator circuit 114, the roll rate "rol" obtained by the roll calculating unit 118, and the distance between the shock absorbers 103FL and 103FR at the front left and right wheels.

The sprung speed "vRR" at the vehicle body rear right wheel portion is calculated based on the sprung speed "vRL" at the vehicle body rear left wheel portion obtained by the sprung speed estimating circuit 115, the roll rate "rol" obtained by the roll calculating unit 118, and the distance between the shock absorbers 103RL and 103RR at the rear left and right wheels.

Figure 17:
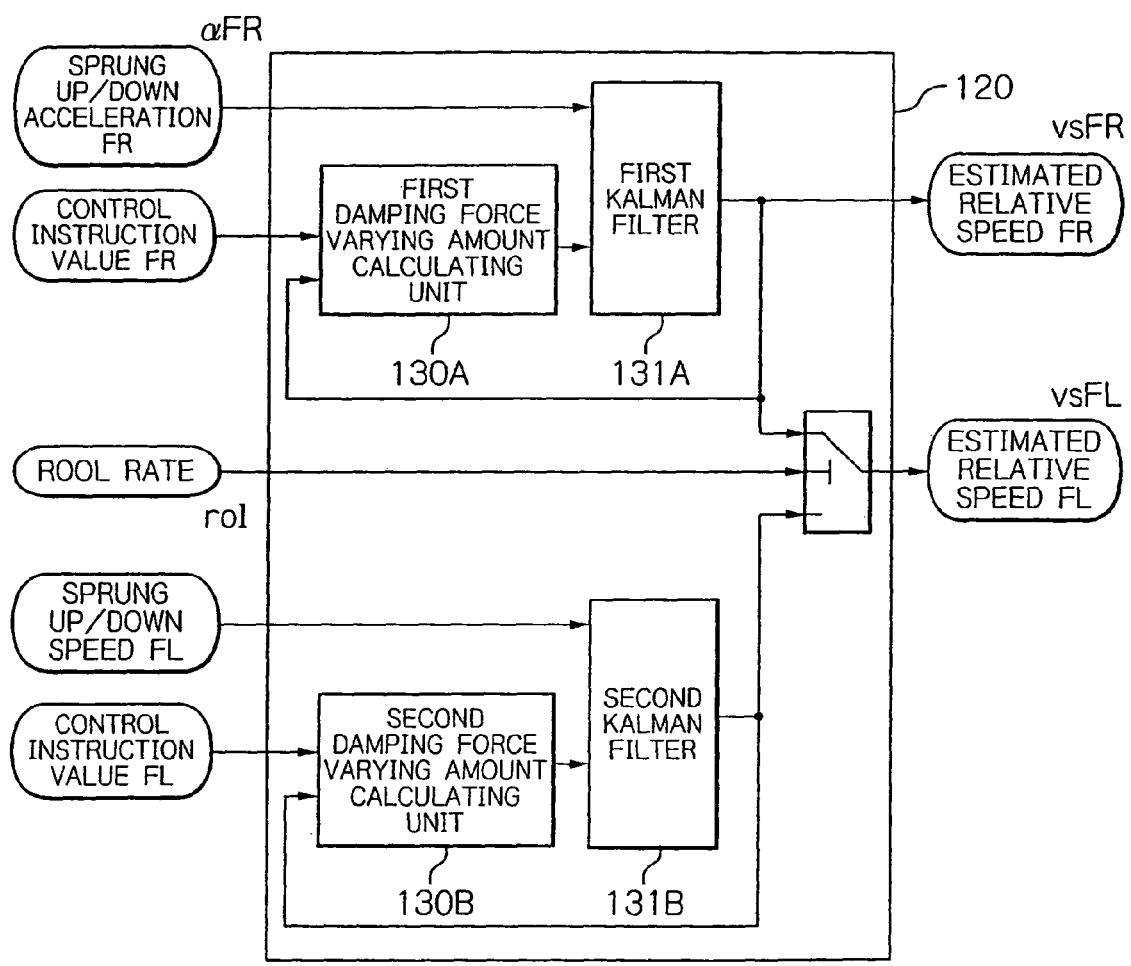
FIG. 17 is a block diagram illustrating a front wheel relative speed estimating unit shown in FIG. 10.

As shown in FIG. 17, the front wheel relative speed estimating unit 120 includes damping force varying amount calculating units (the two units are provided, and hereinafter they are also referred to as "first damping force varying amount calculating unit 130A" and "second damping force varying amount calculating unit 130B"), and Kalman filters (the two filters are provided, and hereinafter they are also referred to as "first Kalman filter 131A" and "second Kalman filter 131B") in which the modern control theory is employed. The unit 120 receives inputs of the detected value of the sprung acceleration sensor 107 (sprung acceleration "αFR" at the front right wheel portion), the roll rate "rol" of the roll calculating unit 118, and the sprung speeds vFR, vRR, vFL, vRL of the bounce estimating unit 119 to estimate a relative speed "vsFR" at the front right wheel and a relative speed "vsFL" at the front left wheel. If an absolute value of the roll rate "rol" of the roll calculating unit 118 is less than a predetermined threshold value, then the right and left speeds are outputted so that they are the same, i.e., the relative speed FR=the relative speed FL. If the absolute value of the roll rate "rol" is larger than the threshold value, then the unit 120 selects and outputs the values of the relative speeds (relative speeds vsFR and vsFL at the front right and left wheels) calculated with use of the first and second Kalman filters 131A and 131B based on the sprung speeds (vFR, vRR, vFL, vRL) estimated by the bounce estimating unit 119.

Here, the content of the Kalman filters (131A and 131B) used in the front wheel relative speed estimating unit 120 will be further described. The description of the portions similar to the Kalman filter used in the sprung speed estimating circuit 115 will be omitted.

The Kalman filter (observer) is formed with use of a similar model to that of the Kalman filter 131 in the sprung speed estimating circuit 115 (refer to FIG. 12). The state variable is expressed by following equation (18).

[equation (18)]

$$x = [\dot{z}_{20} z_{20}]^T$$

Here, the output is an up/down acceleration expressed by following equation (19).

[equation (19)]

$$y = \ddot{z}_b$$

Also, the input is an external force acting on the vehicle body 105, i.e. u=f, and the disturbance is an unsprung acceleration expressed by following equation (20).

[equation (20)]

$$w = \ddot{z}_0$$

Here, the equation (21) is presented.

[equation (21)]

$$A = \begin{bmatrix} -\frac{c}{m} & -\frac{k}{m} \\ 1 & 0 \end{bmatrix} \quad (9)$$

$$B = \begin{bmatrix} -\frac{1}{m} \\ 0 \end{bmatrix}, G = \begin{bmatrix} -1 \\ 0 \end{bmatrix}$$

$$C = \begin{bmatrix} -\frac{c}{m} & -\frac{k}{m} \end{bmatrix}, D = \begin{bmatrix} -\frac{1}{m} \end{bmatrix}$$

If the absolute sprung acceleration can be determined, the Kalman filter (observer) is expressed by the equation (22) from the equation (15).

[equation (22)]

$$\dot{\hat{x}} = A\hat{x} + Bu + L(y - C\hat{x} - Du) \quad (10)$$

The observer gain L is the same as that used in the Kalman filter 131 in the sprung speed estimating circuit 115 [refer to equation (17)]. In order to take a damping force varying amount into consideration, similarly to the sprung speed estimating circuit 115, the first and second damping force varying amount calculating units 130A and 130B calculate damping force varying amounts based on the estimated relative speed values obtained by the first and second Kalman filters 131A and 131B and the control instruction values calculated by the skyhook control unit 123, and the calculated damping force varying amounts are fed back to the first and second Kalman filters 131A and 131B.

Figure 18:
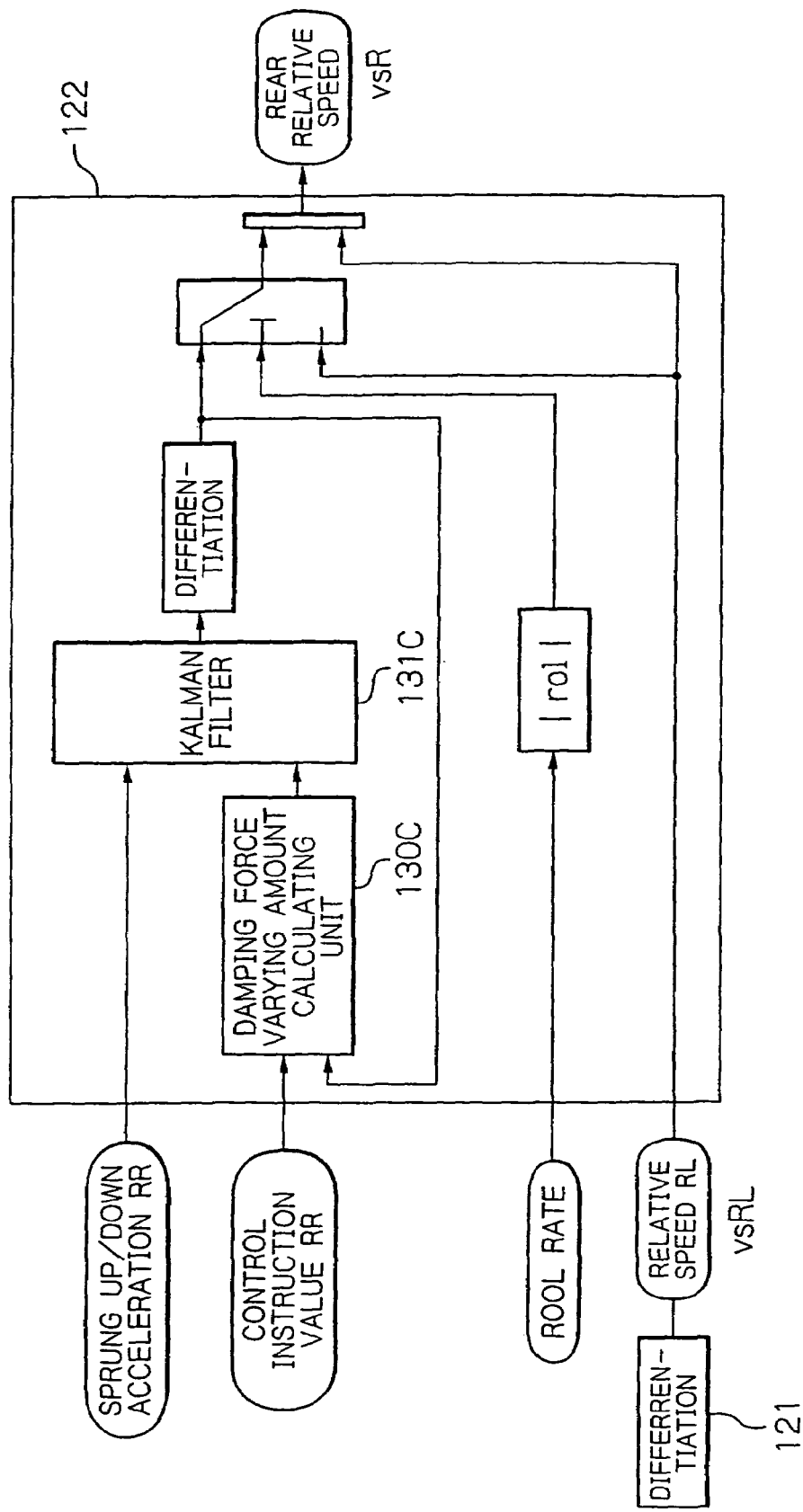
FIG. 18 is a block diagram illustrating a rear wheel relative speed estimating unit shown in FIG. 10.

The rear relative speed estimating unit 122 will now be described in detail. As shown in FIG. 18, the rear relative speed estimating unit 122 receives inputs of the rear left wheel relative speed "vsRL" obtained by differentiating the detection value of the vehicle height sensor 110 mounted corresponding to the rear left wheel, the roll rate "rol" calculated by the roll calculating unit 118, and the sprung speeds (estimated value) [vFR, vRL, vFL, vRR] of the bounce estimating unit 119. If an absolute value of the calculated value (roll rate "rol") of the roll calculating unit 118 is less than a threshold value, then the relative speeds are outputted so that the left and right relative speeds are the same, i.e., relative speed vsRR=relative speed–vsRL. If the absolute value of the calculated value (roll rate "rol") of the roll calculating unit 118 is more than the threshold value, then the unit 122 selects and outputs the relative speeds (relative speeds of the rear right and left wheel portions "RR" and "RL") calculated by the Kalman filter 131C based on the sprung speeds estimated by the bounce estimating unit 119.

The Kalman filter 131C is the same as that used in the front wheel relative speed estimating unit 120.

As mentioned above, the pitch rate "pt" and the roll rate "rol" of the vehicle body 105, and the sprung speeds and the relative speeds of the wheels are calculated, and the skyhook control portion 123 creates and outputs control instruction values to the shock absorbers 103 based on the calculated signals.

According to the present embodiment, the relative speeds between each of the wheels 102 and the vehicle body 105 are calculated and are used for calculation of the control instruction values for the skyhook control. Therefore, the control instruction values can be created individually for the shock absorbers 103 associated with the wheels, whereby damping force generating control of the shock absorbers 103 can be accurately performed according to the conditions of the wheels.

In the present embodiment, the warp "wp" of the vehicle body 105 is calculated based on the sprung speeds on the two diagonally opposite portions of the vehicle body 105, and the roll rate "rol" is calculated by subtracting the pitch rate "pt" obtained based on the wheel speed from the warp "wp". Then, the sprung speeds of the portions of the vehicle body 105 corresponding to the four wheels, and the relative speeds between the wheels 102 and the vehicle body 105 are obtained based on the sprung speed at one of the two diagonally opposite portions and the roll rate "rol", and can be used for creating the control instruction values for the skyhook control. Only two sensors are required as sensors serving as the acceleration sensor and the vehicle height sensor for detecting the sprung speeds at the two diagonally opposite portions of the vehicle body 105, whereby it is possible to simplify a configuration of apparatuses, and also it is possible to cut down cost.

In the present embodiment, the sprung acceleration sensor 107 and the vehicle height sensor 110 are disposed on the diagonally opposite portions of the vehicle body 105. However, instead of it, two sprung acceleration sensors, or two vehicle height sensors may be disposed. The two sensors may be disposed in any arrangement, except that the two sensors are disposed in parallel in the pitch direction. As long as the two sensors are, even slightly, out of alignment in the roll direction (left-right direction), a detected warp motion can contain a roll component, whereby it is possible to calculate a roll motion by subtracting the pitch motion from the warp motion.

In the present embodiment, the vehicle height sensor 110 is used. If the vehicle already has a vehicle height sensor at a rear of the vehicle, for example, a vehicle equipped with a light axis auto adjusting system, the existing vehicle height sensor can be used as the vehicle height sensor 110 in the present embodiment so that a required number of additional sensors can be reduced, whereby a simple structure of a vehicle can be realized and cost up can be avoided.

In the present embodiment, as mentioned above, subtraction of the pitch rate "pt" from the warp "wp" calculates the roll rate "rol", which is in turn used for calculating the bounce motion and the sprung speeds of the four wheels. Then, based on this detection result, the relative speeds between the wheels and the vehicle body, and the control instruction values for the skyhook control are obtained. Instead of this process, the pitch rate "pt" may be calculated by subtracting the roll rate "rol" from the warp "wp", and the bounce motion and the sprung speeds of the four wheels may be obtained based on the thus-calculated pitch rate "pt", and based on this detection result, the relative speeds between the wheels and the vehicle body, and the control instruction values for the skyhook control may be obtained.

In the present embodiment, the pitch rate and the roll rate are respectively estimated, but a gyro sensor may be provided. A pitch rate signal and a roll rate signal used by another system such as a vehicle navigation system may be obtained via a vehicle body network (for example, CAN) to be used.

As clearly understood from the description of the present embodiment, the sprung speeds of the four wheels and the relative speeds between the wheels and the vehicle body are obtained based on the sprung speeds at the two diagonally opposite corners of the vehicle body 105, and then the control instruction values to the shock absorbers 103 of the four wheels are calculated for the skyhook control, whereby control accuracy can be improved.

In the skyhook control in the present embodiment, data of the relative speeds are not required when the vehicle uses a shock absorber of damping force reverse type (type having damping force characteristics which reverse between an extension stroke and a compression stroke).

In the present embodiment, the skyhook control is employed. However, any theory may be used as long as the damping force of the shock absorber can be determined based on data relating sprung motions (displacement, speed, acceleration) at the four wheels. Examples thereof include H∞ control or a modern control theory.

Fifth Embodiment

Hereinafter, a fifth embodiment of the present invention will be described with reference to FIGS. 19 to 25.

Figure 19:
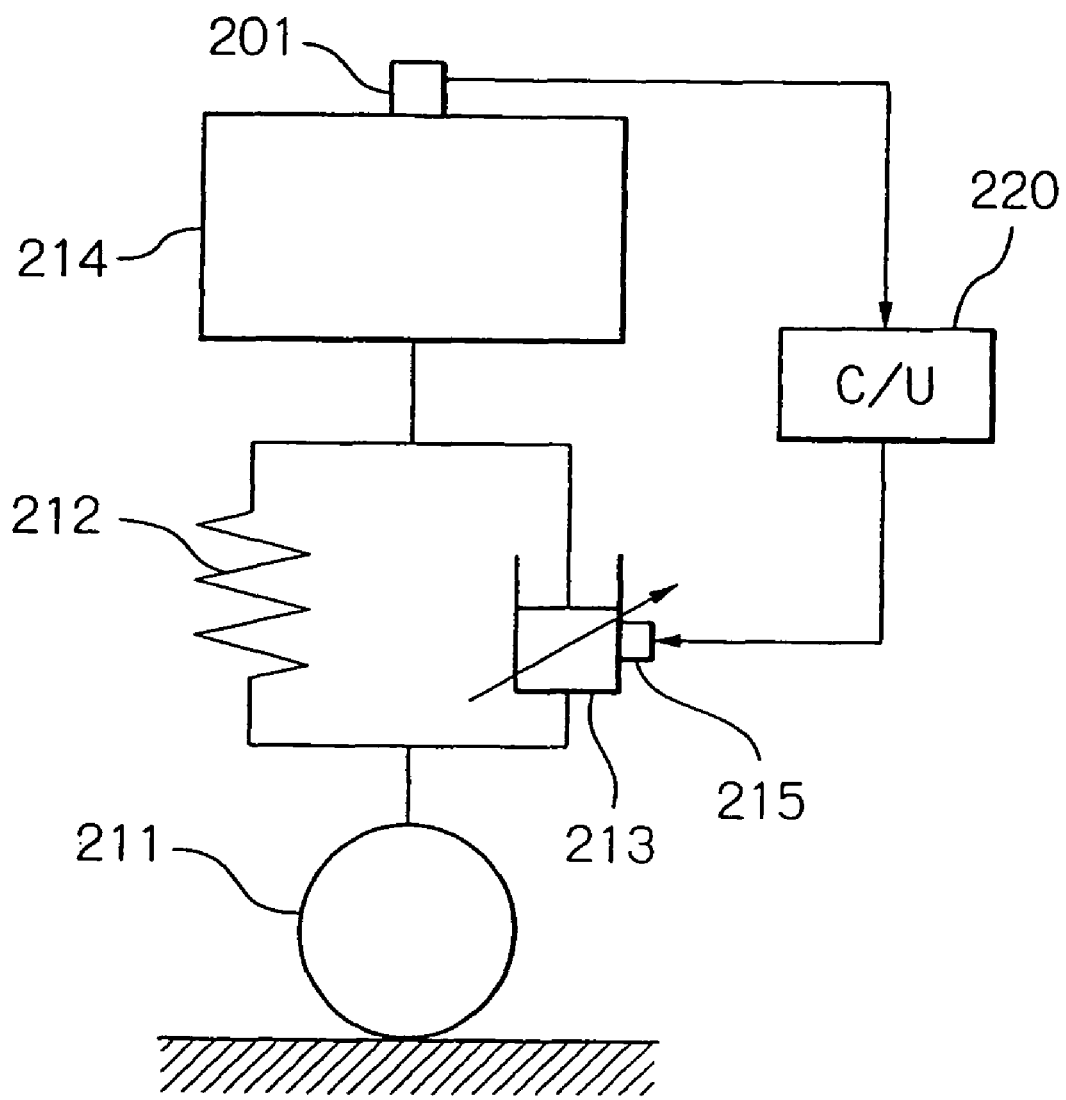
FIG. 19 schematically illustrates a suspension control apparatus of an embodiment of the present invention.

Referring to FIG. 19, an automobile (vehicle) comprises a vehicle body 214 and four wheels 211 (only one of the wheels is shown). A spring 212 and a damping characteristics adjustable damper 213 are disposed in parallel between the vehicle body 214 and the wheel 211 so as to support the vehicle body 214. The four dampers 213 and springs 212 are respectively disposed corresponding to the four wheels, but only one of the dampers 213 and one of the springs 212 are shown in FIG. 19 for simplification of illustration.

A sprung acceleration sensor 201 is disposed at a position of the vehicle body 214 for detecting an up/down acceleration at the position (sprung up/down acceleration, hereinafter also referred to as "sprung acceleration").

The damper 213 comprises a not-shown damping force generating portion, and an actuator 215 for driving the damping force generating portion.

Figure 20:
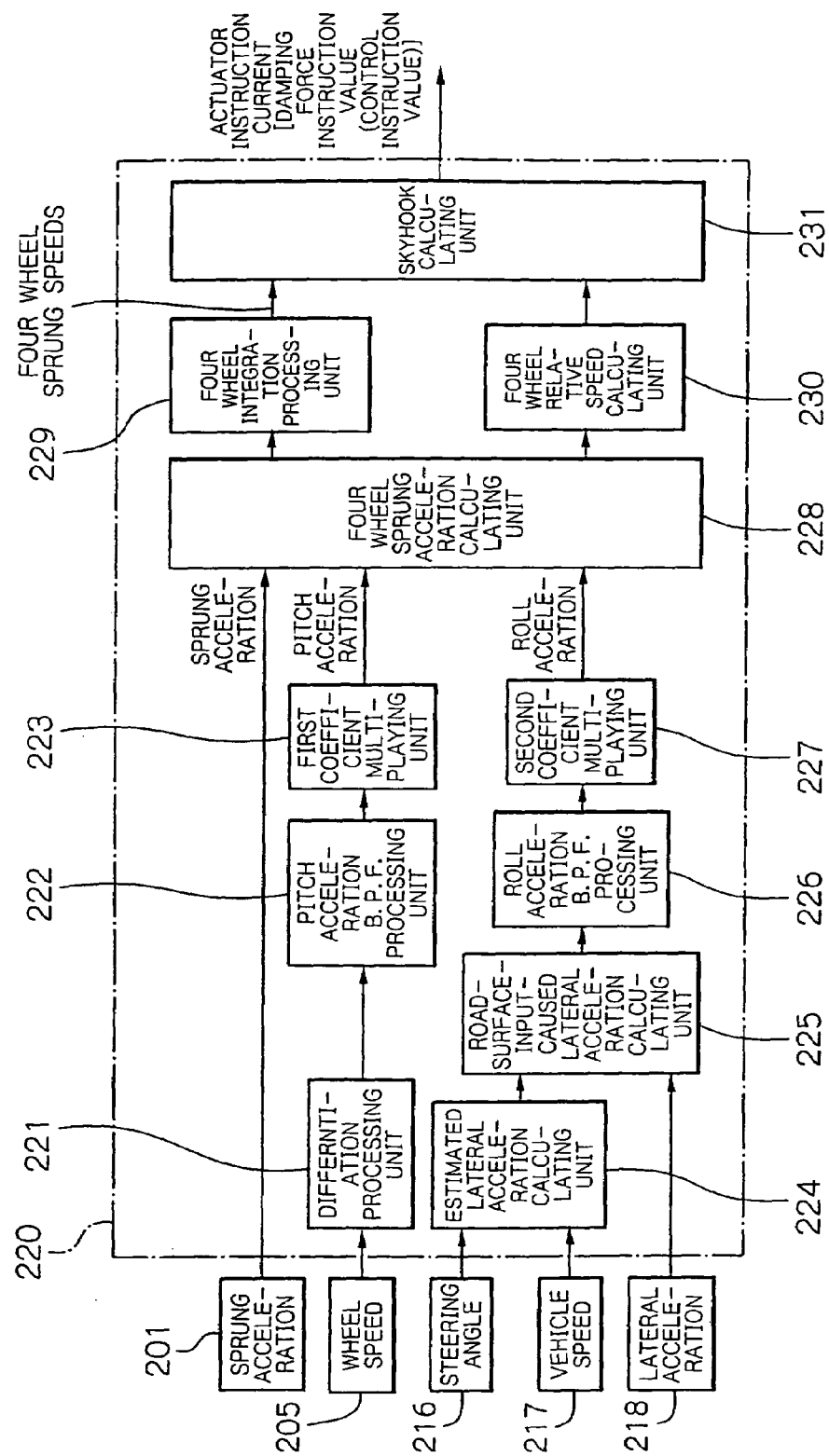
FIG. 20 is a block diagram illustrating a structure of a controller shown in FIG. 19.

Further, as shown in FIG. 20, a steering angle sensor 216, a vehicle speed sensor 217, a lateral acceleration sensor 218 and wheel speed sensors 205 for the four wheels are disposed at the automobile.

A controller 220 is connected to the sprung acceleration sensor 201, the actuators 215, the steering angle sensor 216, the vehicle speed sensor 217, the lateral acceleration sensor 218, and the wheel speed sensor 205.

As shown in FIG. 20, the controller 220 comprises a differentiation processing unit 221, a B. P. F processing unit (hereinafter referred to as "pitch acceleration B. P. F processing unit") 222, a coefficient multiplying unit (hereinafter referred to as "first coefficient multiplying unit") 223, an estimated lateral acceleration calculating unit 224, a road-surface-input-caused lateral acceleration calculating unit 225, a B. P. F processing unit (hereinafter referred to as "roll acceleration B. P. F processing unit) 226, a coefficient multiplying unit (hereafter referred to as "second coefficient multiplying unit") 227, a four wheel sprung acceleration calculating unit 228, an integration processing unit (hereinafter referred to as "four wheel integration processing unit") 229, a four wheel relative speed calculating unit 230, and a skyhook calculating unit 231.

The differentiation processing unit 221 calculates a wheel acceleration from wheel speed information detected by the wheel speed sensor 205.

The pitch acceleration B. P. F processing unit 222 extracts a pitch acceleration component by performing a B. P. F (Band Path Filter) process on the wheel acceleration signal from the differentiation processing unit 221.

The first coefficient multiplying unit 223 calculates a pitch acceleration by multiplying the pitch acceleration component extracted at the pitch acceleration B. P. F processing unit 222 by a predetermined coefficient.

The estimated lateral acceleration calculating unit 224 calculates a "swiveling-caused lateral acceleration" (estimated lateral acceleration) generated by a steering operation, based on steering angle information detected by the steering angle sensor 216, and vehicle speed information detected by the vehicle speed sensor 217.

The road-surface-input-caused lateral acceleration calculating unit 225 calculates a "road-surface-input-caused lateral acceleration" based on the "swiveling-caused lateral acceleration" calculated at the estimated lateral acceleration calculating unit 224, and lateral acceleration information detected by the lateral acceleration sensor 218.

The roll acceleration B. P. F processing unit 226 extracts a roll acceleration component by performing a B. P. F process on the "road-surface-input-caused lateral acceleration".

The second coefficient multiplying unit 227 calculates a roll acceleration by multiplying the roll acceleration component extracted at the roll acceleration B. P. F processing unit 226 by a predetermined coefficient.

The four wheel sprung acceleration calculating unit 228 calculates four wheel sprung up/down accelerations which are up/down accelerations at portions of the vehicle body 214 corresponding to the respective four wheels (hereinafter also referred to as "four wheel sprung accelerations"), based on the sprung acceleration (sprung up/down acceleration) information obtained by the sprung acceleration sensor 201, the pitch acceleration obtained by the first coefficient multiplying unit 223, and the roll acceleration obtained by the second coefficient multiplying unit 227.

The four wheel integration processing unit 229 calculates four wheel sprung up/down speeds (hereinafter also referred to as "four wheel sprung speeds") based on the four wheel sprung up/down accelerations obtained by the four wheel sprung acceleration calculating unit 228.

Figure 24:
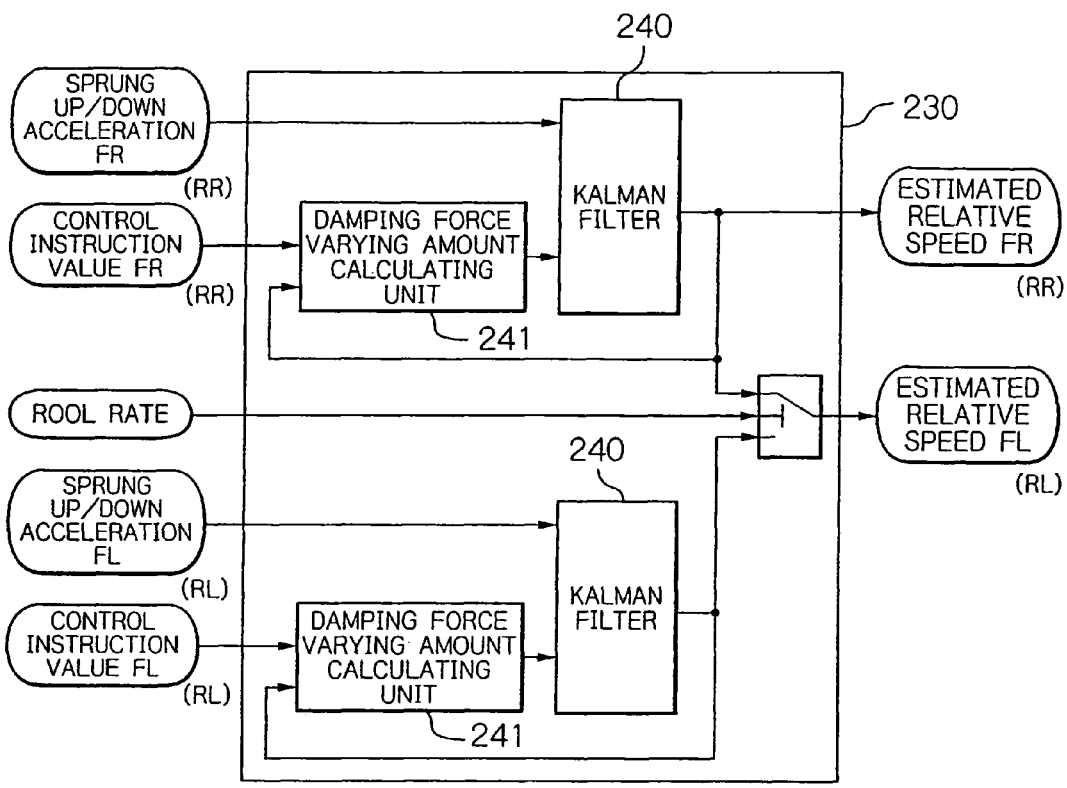
FIG. 24 is a block diagram illustrating a four wheel relative speed calculating unit shown in FIG. 20.
Figure 25:
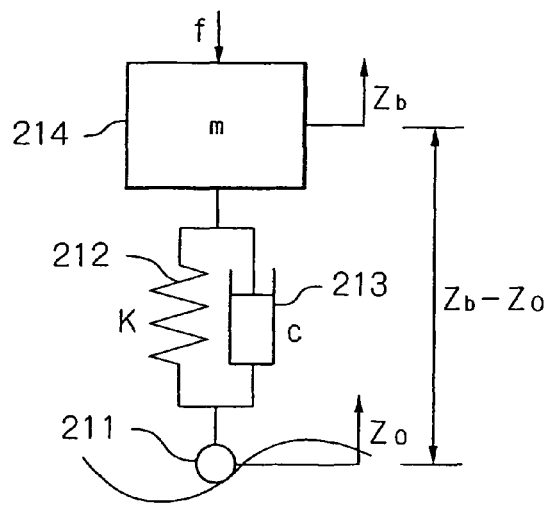
FIG. 25 is an analytical model of an up/down oscillation of a ¼ vehicle body.

As shown in FIG. 24, the four wheel relative speed calculating unit 230 comprises Kalman filters 240 (observers) and damping force varying amount calculating units 241. The unit 230 calculates relative speeds between the four wheels and the portions of the vehicle body 214 corresponding to the respective four wheels (sprung/unsprung relative speeds, hereinafter also referred to as "four wheel relative speeds"), based on the four wheel sprung accelerations obtained by the four wheel sprung acceleration calculating unit 228.

The skyhook calculating unit 231 generates instruction currents (damping force instruction values, control instruction values) for the skyhook control to the actuators 215 based on the four wheel sprung speeds obtained by the four wheel integration processing unit 229, and the four wheel relative speeds obtained by the four wheel relative speed calculating unit 230, and inputs the instruction currents to the respective actuators 215 to control the dampers 213.

In the present embodiment, the four wheel sprung speeds and the four wheel relative speeds are calculated by utilizing the pitch acceleration obtained by performing differentiation process (differentiation processing unit 221) on the wheel speeds from the wheel speed sensors 205. According to the present embodiment, since the four wheel sprung speeds and the four wheel relative speeds are calculated by utilizing the pitch acceleration obtained based on the wheel speeds detected by the wheel speed sensors 205, it is possible to minimize influence of the wheel body acceleration.

In the present embodiment, in estimation of the rear sprung up/down acceleration from the sprung up/down acceleration and the pitch acceleration, no error is made since a detection value of the sprung acceleration sensor 201 is used as the sprung up/down acceleration.

Similarly to estimation of wheel speed, the wheel acceleration can be estimated by extracting frequency regions that are in or below the very low frequency area (for example, 0.05 Hz) and in or above the very high frequency area (for example, 15 Hz) without limiting to a certain narrow frequency component (for example, resonant frequency of sprung mass). Therefore, estimation of the pitch acceleration from the wheel acceleration, and estimation of the rear sprung up/down acceleration from the sprung up/down acceleration and the pitch acceleration become more accurate.

In the present embodiment, the sprung/unsprung relative speeds are estimated by the Kalman filters 240 (observers) which receive the four wheel sprung up/down accelerations as input data. Therefore, in the present embodiment, the calculation process can be cut down. In addition, it is possible to eliminate calculation errors which would otherwise be caused by performing the differentiation process and the filtering process, whereby damping force instruction values can be accurately created to perform an effective suspension control.

In the present embodiment, the roll varying amount is corrected by using the roll acceleration estimated by the steering angle, the vehicle speed and the lateral acceleration, and the sprung up/down accelerations, sprung up/down speeds and the sprung/unsprung relative speeds for all of the four wheels are calculated, whereby estimation accuracy and control performance can be improved. Therefore, effective control performance can be secured in the present embodiment.

The process of the controller 220 will be described with reference to the flow chart in FIG. 21 for better understanding of function of the present embodiment.

Figure 21:
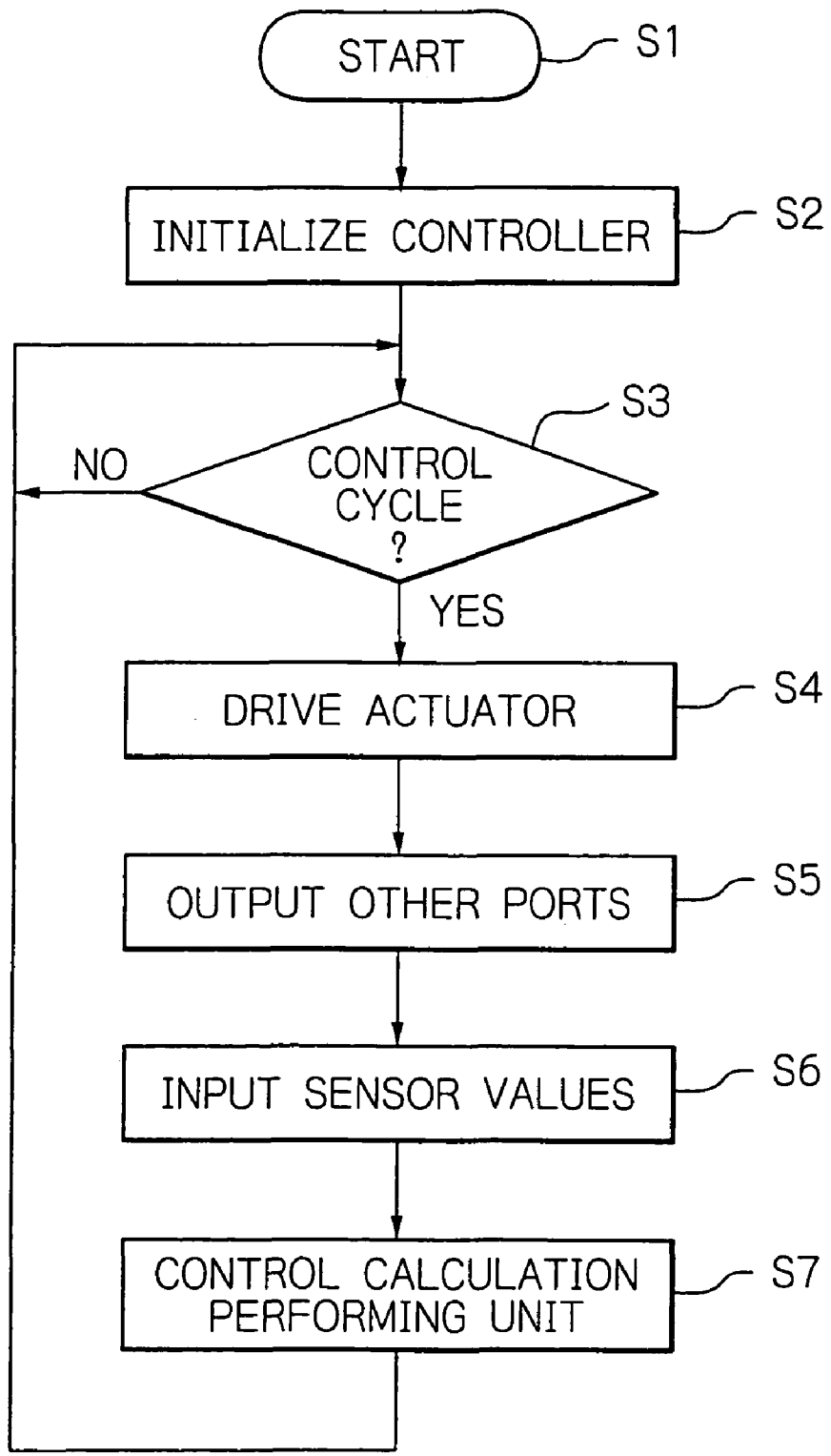
FIG. 21 is a flow chart illustrating a main control performed by the controller shown in FIG. 20.

Referring to FIG. 21, electric power is supplied to the controller 220, and a control software starts to run (step S1). The controller 220 is initialized (step S2). Then, it is determined whether a predetermined control cycle is completed or not (step S3). If it is determined at step S3 that the control cycle is not yet completed, then the flow returns and it is again determined whether the control cycle is completed. If it is determined at step S3 that the control cycle is completed (YES), then a control amount calculated at the control cycle is outputted to the actuator 215 (step S4). Then, sensor information is read out (step S5).

The sensor information is inputted to the appropriate units (step S6), and the sprung speed and the sprung/unsprung relative speed are estimated and the actuator instruction value (actuator instruction current, damping force instruction value) is calculated at a control calculation performing unit (control calculation performing subroutine) of step S7, based on the inputted sensor information.

The process of the control calculation processing unit will be described with reference to FIG. 22 (flow chart) and FIG. 23 (illustrating the relationship among the sprung up/down acceleration, the pitch acceleration and the roll acceleration).

Figure 22:
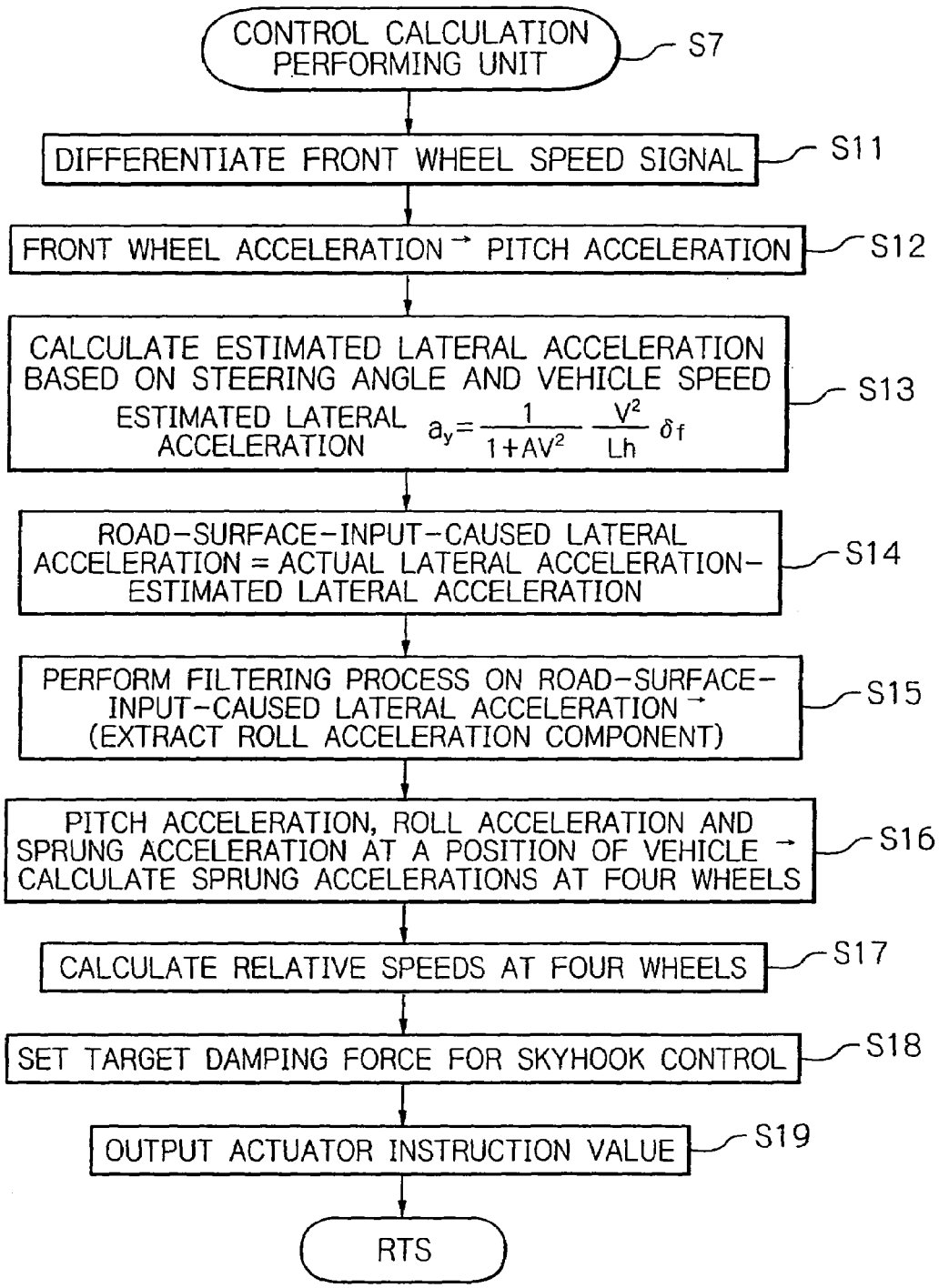
FIG. 22 is a flow chart illustrating a process performed by a control calculation performing unit shown in FIG. 21.

Referring to FIG. 22, the front wheel speed signal is differentiated to calculate the wheel acceleration (step S11). Then, the band path filtering process is performed on the wheel acceleration signal to extract the pitch acceleration component having a predetermined frequency component (step S12).

The estimated lateral acceleration generated by a swiveling motion is calculated based on the steering angle and the vehicle speed (step S13). With a given linear model of the vehicle, an estimated lateral acceleration "ay" can be expressed by the following equation in which dynamic characteristics are ignored.

$$ay = [1/(1 \pm AV^2)] \cdot [V^2/(Lh)] \delta f \quad (23)$$

in which "V" represents a vehicle speed [m/s], "A" represents a stability factor [s²/m²], "δf" represents a front wheel steering angle [rad], and "Lh" represents a wheel base [m].

The lateral acceleration detected by the lateral acceleration sensor 218 includes both of the swiveling lateral acceleration generated by a steering operation, and the lateral acceleration induced by a vehicle body roll motion caused by influence of a road surface input ("road-surface-input caused lateral acceleration"). Therefore, "road-surface-input-caused lateral acceleration" [=(actual lateral acceleration)−(estimated lateral acceleration)] is calculated by subtracting the estimated lateral acceleration estimated based on the steering angle and the vehicle speed from the lateral acceleration (actual lateral acceleration) detected by the sensor (step S14).

Since the "road-surface-input-caused lateral acceleration" (lateral acceleration induced by a vehicle roll motion caused by influence of a road surface input) is a tangential acceleration of the roll acceleration, the roll acceleration component having a predetermined frequency component is extracted by performing a band path filter process on the lateral acceleration (step S15).

Next, sprung accelerations of the four wheels are calculated (step S16). Assuming the vehicle body 214 is a rigid body, an up/down acceleration at an arbitrary position of the vehicle body 214 is geometrically determined from a sprung up/down acceleration at a position of the vehicle body 214, a pitch rate and a roll rate, as shown in FIG. 23(*a*). A coaxial sprung up/down acceleration when the sprung acceleration sensor (sprung up/down acceleration sensor) 201 is disposed as shown in FIG. 23(*b*) is calculated as follows.

In the equation which will be described below, "G sensor" represents a sprung up/down acceleration [m/s²] at an attachment position of the sprung acceleration sensor 201, "G FR" represents a front sprung up/down acceleration [m/s²], "G RR" represents a rear sprung up/down acceleration [m/s²], "L1" represents a distance from the attachment position of the sprung acceleration sensor 201 to the front sprung up/down acceleration to be determined, "L2" represents a distance from the attachment position of the sprung acceleration sensor 201 to the rear sprung up/down acceleration to be determined, and "AGy" represents a pitch acceleration [rad/s²].

The front sprung up/down acceleration G FR can be calculated by the following equation.

$$GFR = Gsensor + AGy \times L1 \quad (24)$$

The rear sprung up/down acceleration G RR can be calculated by the following equation.

$$GRR = Gsensor - AGy \times L2 \quad (25)$$

$$GRR = Gsensor - AGy \times L2$$

In this way, a sprung up/down acceleration at a position to be determined can be calculated if a distance from the attachment position of the sprung acceleration sensor 201 to the position to be determined, and a rotational speed are determined.

Also, a sprung up/down acceleration at a position disposed on the left/right axis can be calculated from a roll acceleration in the same manner as estimation from a pitch acceleration.

Figure 23:
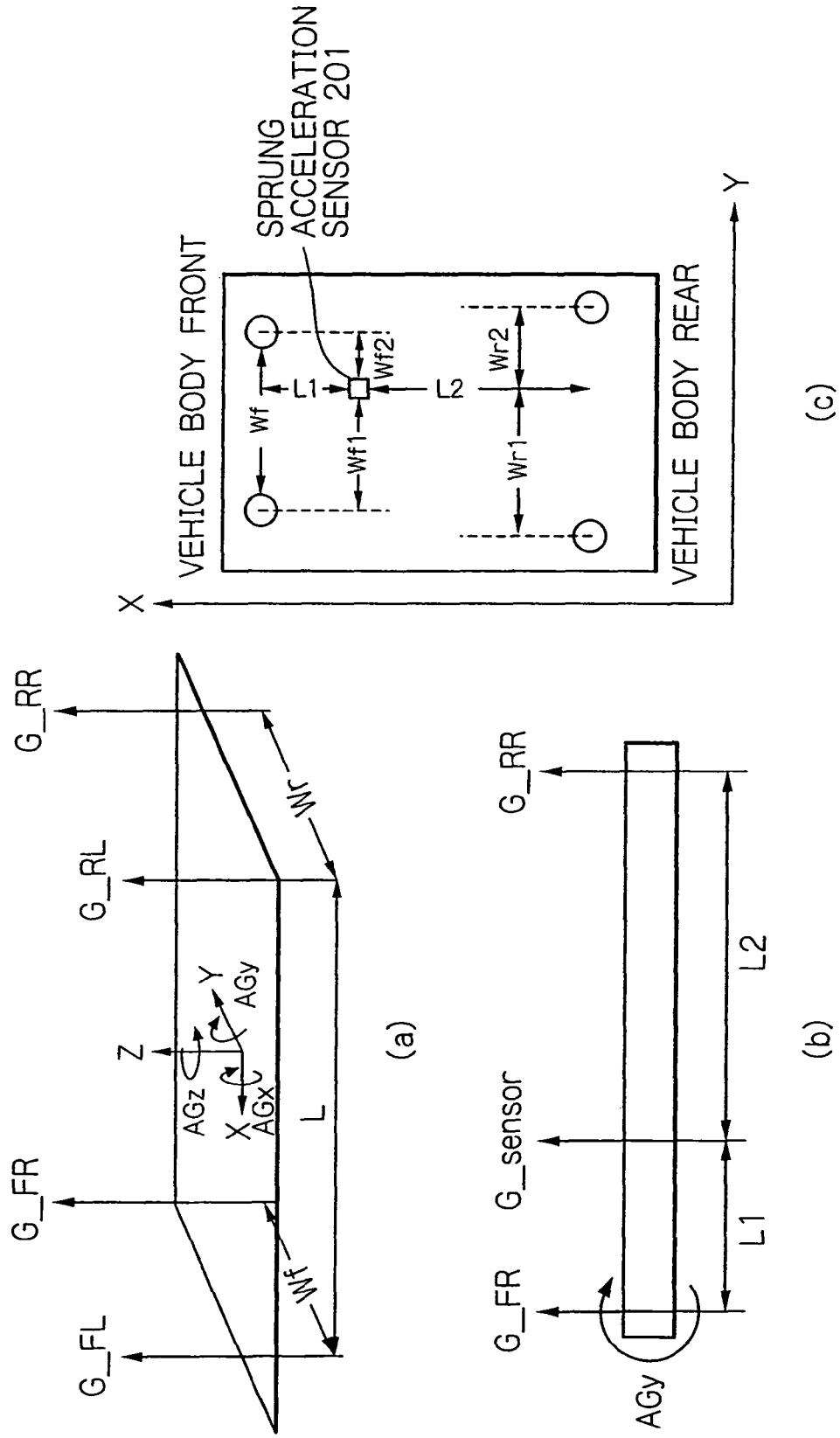
FIG. 23($a$) illustrates a relationship among a sprung up/down acceleration, a pitch acceleration and a roll acceleration acting on a vehicle body, FIG. 23($b$) illustrates a relationship between the sprung up/down acceleration and the pitch acceleration, and FIG. 23($c$) schematically illustrates an arrangement of acceleration sensors.

Referring to FIG. 23(*c*), in the vehicle equipped with the sprung acceleration sensor 201, a sprung up/down acceleration at the position of the damper 213 on each wheel is calculated as follows.

"G sensor" represents a sprung up/down acceleration [m/s²] at the attachment position of the sprung acceleration sensor 201, "G FR" represents a sprung up/down acceleration [m/s²] at the front right position, "G FL" represents a sprung up/down acceleration [m/s$^2$] at the front left position, "G RR" represents a sprung up/down acceleration [m/s$^2$] at the rear right position, "G RL" represents a sprung up/down acceleration [m/s$^2$] at the rear left position, "L1" represents an X-axis distance from the attachment position of the sprung acceleration sensor 201 to the front sprung up/down acceleration to be determined, "L2" represents an X-axis distance from the attachment position of the sprung acceleration sensor 201 to the rear sprung up/down acceleration to be determined, "Wf1" represents a Y-axis distance from the attachment position of the sprung acceleration sensor 201 to the front left sprung up/down acceleration to be determined, "Wf2" represents a Y-axis distance from the attachment position of the sprung acceleration sensor 201 to the front-right sprung up/down acceleration to be determined, "Wr1" represents a Y-axis distance from the attachment position of the sprung acceleration sensor 201 to the rear-left sprung up/down acceleration to be determined, "Wr2" represents a Y-axis distance from the attachment position of the sprung acceleration sensor 201 to the rear-right sprung up/down acceleration to be determined, "AGy" represent a pitch acceleration [rad/s$^2$], and "AGx" represent a roll acceleration [rad/s$^2$].

The front right sprung up/down acceleration "G FR" is calculated by the following equation.

$$GFR = Gsensor + AGy \times L1 - AGx \times Wf2 \tag{26}$$

The front left sprung up/down acceleration "G FL" is calculated by the following equation.

$$GFL = Gsensor + AGy \times L1 + AGx \times Wf1 \tag{27}$$

The rear right sprung up/down acceleration "G RR" is calculated by the following equation.

$$GRR = Gsensor - AGy \times L2 - AGx \times Wf2 \tag{28}$$

The rear left sprung up/down acceleration "G RL" is calculated by the following equation.

$$GRL = Gsensor - AGy \times L2 + AGx \times Wf1 \tag{29}$$

The sprung up/down accelerations of the four wheels can be obtained in this way. Relative speeds of the four wheels is calculated by inputting the respective sprung up/down accelerations of the four wheels to the Kalman filters 240 (step S17).

The four wheel relative speed calculating unit 230 will be described in further details. As shown in FIG. 24, the four wheel relative speed calculating unit 230 comprises damping force varying amount calculating units 241 (four units 241 are provided for the four wheels, but only two for the front left and right wheels are shown in FIG. 24), and the Kalman filters 240 employing the modern control theory (four filters 240 are provided for the four wheels, but only two for the front left and right wheels are shown in FIG. 24). The four wheel relative speed calculating unit 230 receives inputs of the values calculated at the four wheel sprung acceleration calculating unit 228 (four wheel sprung up/down accelerations), the roll acceleration (estimated value) obtained from the second coefficient multiplying unit 227 through the four wheel sprung acceleration calculating unit 228, and the pitch acceleration (estimated value) obtained from the first coefficient multiplying unit 223 through the four wheel sprung acceleration calculating unit 228. If an absolute value of the roll acceleration (estimated value) is less than a predetermined threshold value, then the relative speeds are outputted so that the right and left speeds are the same, i.e., relative speed FR=relative speed FL, and relative speed RR=relative speed RL. If the absolute value of the roll acceleration is more than the predetermined threshold value, then the unit 230 selects and outputs the relative speeds obtained by inputting to the Kalman filters 240 the four wheel sprung accelerations estimated at the four wheel sprung acceleration calculating unit.

The observer for estimating the relative speed from the sprung acceleration will now be described in detail. The observer is formed based on the ¼ vehicle body model shown in FIG. 25, which is an exemplary model of an up/down oscillation of the vehicle body 214 with one free degree [$Z_b$: absolute displacement of the vehicle body 214, $Z_0$: absolute up/down displacement of unsprung mass, k: spring coefficient, c: damping coefficient, f: external force acting on the vehicle body 214, m: mass of the vehicle body 214]. Here, the state variable is [equation (30)]

$$x = [\dot{z}_{20} z_{20}]^T$$

the output is an up/down acceleration

[equation (31)]

$$y = \ddot{z}_b$$

the input is an external force acting on the vehicle body 214, i.e. u=f, and the disturbance is an unsprung acceleration

[equation (32)]

$$w = \ddot{z}_0$$

The following equation (33) is provided.

[equation (33)]

$$A = \begin{bmatrix} -\dfrac{c}{m} & -\dfrac{k}{m} \\ 1 & 0 \end{bmatrix} \tag{1}$$

$$B = \begin{bmatrix} -\dfrac{1}{m} \\ 0 \end{bmatrix}, G = \begin{bmatrix} -1 \\ 0 \end{bmatrix}$$

$$C = \begin{bmatrix} -\dfrac{c}{m} & -\dfrac{k}{m} \end{bmatrix}, D = \begin{bmatrix} -\dfrac{1}{m} \end{bmatrix}$$

Therefore, if the sprung absolute acceleration can be determined, the Kalman filter (observer) is expressed by the equation (34) from the equation (33).

[equation (34)]

$$\dot{\hat{x}} = A\hat{x} + Bu + L(y - C\hat{x} - Du) \tag{2}$$

The Kalman filter 240 is used as the observer gain L. In order to take a damping force varying amount into account, the damping force varying amount calculating unit 241 calculates a damping force varying amount based on the estimated relative speed of the Kalman filter 240 and the control instruction value calculated at the skyhook calculating unit 231, and feeds back the calculated value to the Kalman filter.

According to the present embodiment, a relative speed and a relative displacement can be directly estimated from the estimated sprung acceleration by the Kalman filter.

Target damping forces for the four wheels are determined based on the four wheel sprung up/down speeds obtained by integrating the four wheel sprung up/down accelerations calculated as discussed above, and the four wheel relative speeds (step S18). The damping forces of the four wheel dampers 213 (suspensions of the four wheels) are controlled by providing instructions to the actuators 215 based on the determined target damping forces (step S19).

In the present embodiment, the sprung up/down speeds and the relative speeds of the wheels are calculated for the skyhook control. However, the relative speed may not be calculated in the embodiment using a damping force adjustable hydraulic shock absorber of a type having damping force characteristics which reverse between an extension stroke and a compression stroke.

In the present embodiment, the skyhook control is performed using the skyhook calculation unit 231. However, H∞ control or other various modern control theories may be utilized in the present invention. In this case, required data such as an absolute speed and a relative speed can be calculated based on the sprung accelerations of the wheels obtained by the four wheel sprung acceleration calculating unit 228, and therefore those data can be utilized in the control theories.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2007-254575, filed on Sep. 28, 2007 and Japanese Patent Application No. 2007-255453, filed on Sep. 28, 2007. The entire disclosure of the Japanese patent applications including specification, claims, drawings and summary is incorporated herein by reference in its entirety.

What is claimed is:

1. A suspension control apparatus comprising:
    a damping force adjustable shock absorber interposed between a vehicle body and a wheel of a vehicle; and
    a control apparatus operable to control the damping characteristic of the shock absorber, the damping characteristic of the shock absorber being changed by an instruction from the control apparatus,
    wherein the control apparatus comprises
        a first up/down motion calculating unit operable to calculate an up/down motion of a first point set to any position of the vehicle body,
        a roll motion estimating unit operable to estimate a roll motion of the vehicle body,
        a pitch motion estimating unit operable to estimate a pitch motion of the vehicle body,
        a various portions up/down motion calculating unit operable to calculate up/down motions of various portions of the vehicle body based on the up/down motion, the roll motion and the pitch motion, and
        a controller operable to calculate the instruction according to the up/down motions of the various portions and output the instruction to the damping force adjustable shock absorber; and
    the pitch motion estimating unit comprises
        a wheel-speed time-rate-of-change calculating unit operable to detect a rotation of the wheel and calculate a wheel-speed time-rate based on the detected rotation of the wheel,
        a forward/backward acceleration obtaining unit provided separately from the wheel-speed time-rate-of-change calculating unit and being operable to detect or estimate a forward/backward acceleration of the vehicle, and
        a subtracting unit operable to calculate a pitch rate based on a difference between the wheel-speed time-rate-of-change and the forward/backward acceleration.

2. The suspension control apparatus according to claim 1, wherein the wheel-speed time-rate is calculated based on an output from a wheel speed sensor.

3. The suspension control apparatus according to claim 1, wherein the vehicle includes a pair of wheels on left and right sides of the vehicle body, and the wheel-speed time-rate is calculated as an average value of respective rotations of the pair of wheels.

4. The suspension control apparatus according to claim 3, wherein, when the wheel rotations of the pair of wheels are in opposite phases, the pitch rate is not calculated.

5. The suspension control apparatus according to claim 1, wherein the forward/backward acceleration is calculated by the forward/backward acceleration obtaining unit based on an output from a forward/backward acceleration sensor.

6. The suspension control apparatus according to claim 1, wherein the vehicle comprises a motor torque detecting unit operable to detect a torque of a motor, and the forward/backward acceleration is calculated by the forward/backward acceleration obtaining unit based on an output from the motor torque detecting unit.

7. The suspension control apparatus according to claim 6, wherein the forward/backward acceleration is calculated by the forward/backward acceleration obtaining unit based on a product of the output from the motor torque detecting unit and a total speed reduction ratio from the motor to the wheel.

8. The suspension control apparatus according to claim 7, wherein the vehicle comprises a torque converter, and the calculation of the forward/backward acceleration by the forward/backward acceleration obtaining unit includes multiplication by a coefficient according to lockup and slip of the torque converter.

9. The suspension control apparatus according to claim 6, wherein the forward/backward acceleration is calculated by the forward/backward acceleration obtaining unit with an external force acting on the vehicle body taken into consideration.

10. The suspension control apparatus according to claim 1, wherein the vehicle comprises a braking mechanism, and the forward/backward acceleration is calculated based on a braking force generated by the braking mechanism.

11. The suspension control apparatus according to claim 10, wherein the braking mechanism comprises a hydraulic disk brake, and the forward/backward acceleration is calculated based on a hydraulic pressure of the hydraulic disk brake.

12. The suspension control apparatus according to claim 11, wherein the forward/backward acceleration is limited by an upper limit value when it is calculated.

13. The suspension control apparatus according to claim 10, wherein the braking mechanism comprises a regenerative brake, and the forward/backward acceleration is calculated based on an electric power generated by the regenerative brake during braking.

14. The suspension control apparatus according to claim 1, wherein the forward/backward acceleration is calculated based on positional information of the vehicle obtained from a GPS.

15. The suspension control apparatus according to claim 1, wherein:
    the control apparatus further comprises an integrator;
    the up/down motion calculating unit calculates an up/down acceleration of a point of the vehicle body;
    the roll motion estimating unit estimates a roll acceleration of the vehicle body;
    the pitch motion estimating unit estimates a pitch acceleration of the vehicle body;
    the various portions up/down motion calculating unit calculates up/down accelerations of the various portions of the vehicle body based on the up/down acceleration, the roll acceleration and the pitch acceleration;

the integrator calculates up/down speeds of the various portions by integrating the up/down accelerations of the various portions;

the controller calculates an instruction according to the up/down speeds of the various portions, and outputs the instruction to the damping force adjustable shock absorber.

16. The suspension control apparatus according to claim 1, further comprising:

a second up/down motion calculating unit operable to calculate an up/down motion of a second point set to a position apart from the first point in a warp direction that is different from a pitch direction of the vehicle body; and a warp motion calculating unit operable to calculate a warp motion based on the up/down motions of the first and second points, wherein the roll motion estimating unit estimates the roll motion of the vehicle body based on a difference between the warp motion and the pitch motion.

17. The suspension control apparatus according to claim 1, further comprising:

a second up/down motion calculating unit operable to calculate an up/down motion of a second point set to a position apart from the first point in a warp direction that is different from a roll direction of the vehicle body; and a warp motion calculating unit operable to calculate a warp motion based on the up/down motions of the first and second points, wherein the pitch motion estimating unit estimates the pitch motion of the vehicle body based on a difference between the warp motion and the roll motion.

18. The suspension control apparatus according to claim 1, wherein the wheel is a driving wheel on which a driving force for the vehicle acts, and the vehicle includes a driven wheel on which the driving force does not act, and the wheel-speed time-rate is calculated based on a rotation of the driven wheel.

* * * * *